US008739095B2

(12) United States Patent
Cao et al.

(10) Patent No.: US 8,739,095 B2
(45) Date of Patent: May 27, 2014

(54) METHOD, SYSTEM, AND PROGRAM PRODUCT FOR INTERACTIVE CHECKING FOR DOUBLE PATTERN LITHOGRAPHY VIOLATIONS

(75) Inventors: Min Cao, San Ramon, CA (US); Roland Ruehl, San Carlos, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 166 days.

(21) Appl. No.: 12/719,710

(22) Filed: Mar. 8, 2010

(65) Prior Publication Data

US 2011/0219341 A1 Sep. 8, 2011

(51) Int. Cl.
G06F 9/455 (2006.01)
G06F 17/50 (2006.01)

(52) U.S. Cl.
USPC ............. 716/111; 716/51; 716/52; 716/112; 716/119

(58) Field of Classification Search
USPC ............ 716/50, 51, 52, 53, 54, 55, 118, 119, 716/126
See application file for complete search history.

(56) References Cited

U.S. PATENT DOCUMENTS

| | | | |
|---|---|---|---|
| 4,890,238 A | 12/1989 | Klein et al. | |
| 7,913,197 B1 * | 3/2011 | Kruger et al. | 716/53 |
| 7,926,001 B2 * | 4/2011 | Pierrat | 716/50 |
| 8,304,172 B2 * | 11/2012 | Schultz | 430/313 |
| 8,347,240 B2 * | 1/2013 | Agarwal et al. | 716/54 |
| 8,429,582 B1 * | 4/2013 | Lai et al. | 716/112 |
| 8,434,033 B2 * | 4/2013 | Abou Ghaida et al. | 716/55 |
| 2008/0005713 A1 * | 1/2008 | Singh et al. | 716/11 |
| 2008/0077900 A1 | 3/2008 | Oh et al. | |
| 2008/0307381 A1 | 12/2008 | Tritchkov et al. | |
| 2009/0125855 A1 * | 5/2009 | Sahouria et al. | 716/5 |
| 2010/0115489 A1 * | 5/2010 | Song et al. | 716/19 |
| 2010/0199253 A1 | 8/2010 | Cheng et al. | |
| 2011/0014786 A1 | 1/2011 | Sezginer et al. | |
| 2011/0078638 A1 * | 3/2011 | Kahng et al. | 716/52 |
| 2011/0111330 A1 * | 5/2011 | Schultz et al. | 430/5 |
| 2011/0113393 A1 * | 5/2011 | Sezginer | 716/106 |

OTHER PUBLICATIONS

Conley et al. "From Simulation to Characterization—Integrated Approach for Self Aligned Double Patterning Defectivity," Semiconductor Manufacturing (ISSM), 2008 International Symposium on. 2008. pp. 11-14.
Non-Final Office Action dated Sep. 23, 2011 for U.S. Appl. No. 12/614,911.
Fonseca, C. et al., "Advances and challenges in dual-tone development process optimization," Proc. SPIE 7274, 72740I, Feb. 24, 2009.
Non-Final Office Action dated Jan. 17, 2012 for U.S. Appl. No. 12/582,366.

(Continued)

*Primary Examiner* — Thuan Do
*Assistant Examiner* — Brian Ngo
(74) *Attorney, Agent, or Firm* — Vista IP Law Group, LLP

(57) ABSTRACT

Disclosed are a method, apparatus, and computer program product for performing interactive layout editing to address double patterning approaches to implement lithography of electronic designs. A spatial query is performed around the shape(s) being created during editing with the distance of allowed spacing in a single mask. If a design error is encountered, corrective editing may occur to correct the error. Checking may occur to make sure that the error detection and corrective actions can be performed interactively.

27 Claims, 37 Drawing Sheets

(56) References Cited

OTHER PUBLICATIONS

Wiaux, V., "Split and Design Guidelines for Double Patterning," Proceedings of SPIE vol. 6924, p. 692409-1, SPIE, Bellingham, WA, 2008.

Maenhoudt, M., et al., "Alternative process schemes for double patterning that eliminate the intermediate etch step," Proceedings of SPIE vol. 6924 69240P-1, SPIE, Bellingham, WA, 2008.

Bencher, C., "SADP: The Best Option for 32nm NAND Flash," Nanochip Technology Journal, Issue 2, 2007.

Ghan, J, et al, for U.S. Appl. No. 12/189,692, filed Aug. 11, 2008.

Weling et al., for U.S. Appl. No. 12/264,853, filed Nov. 4, 2008.

Weling et al., for U.S. Appl. No. 12/264,139, filed Nov. 3, 2008.

Huckabay et al., for U.S. Appl. No. 12/272,550, filed Nov. 17, 2008.

Non-Final Office Action dated Jun. 26, 2012 for U.S. Appl. No. 12/614,911.

Final Office Action dated Jun. 25, 2012 for U.S. Appl. No. 12/582,366.

Final Office Action dated Nov. 2, 2012 for U.S. Appl. No. 12/614,911.

Notice of Allowance dated May 16, 2013 for U.S. Appl. No. 12/614,911.

Final Office Actioin dated Feb. 15, 2012 for U.S. Appl. No. 12/614,911.

\* cited by examiner

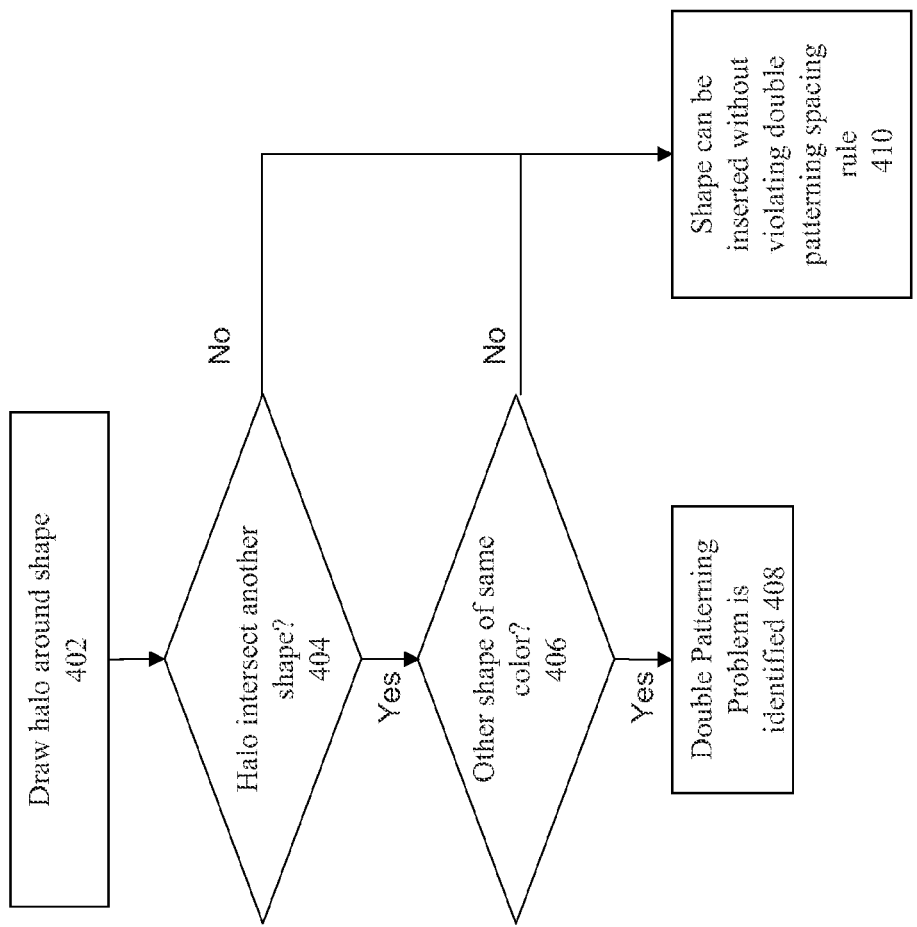

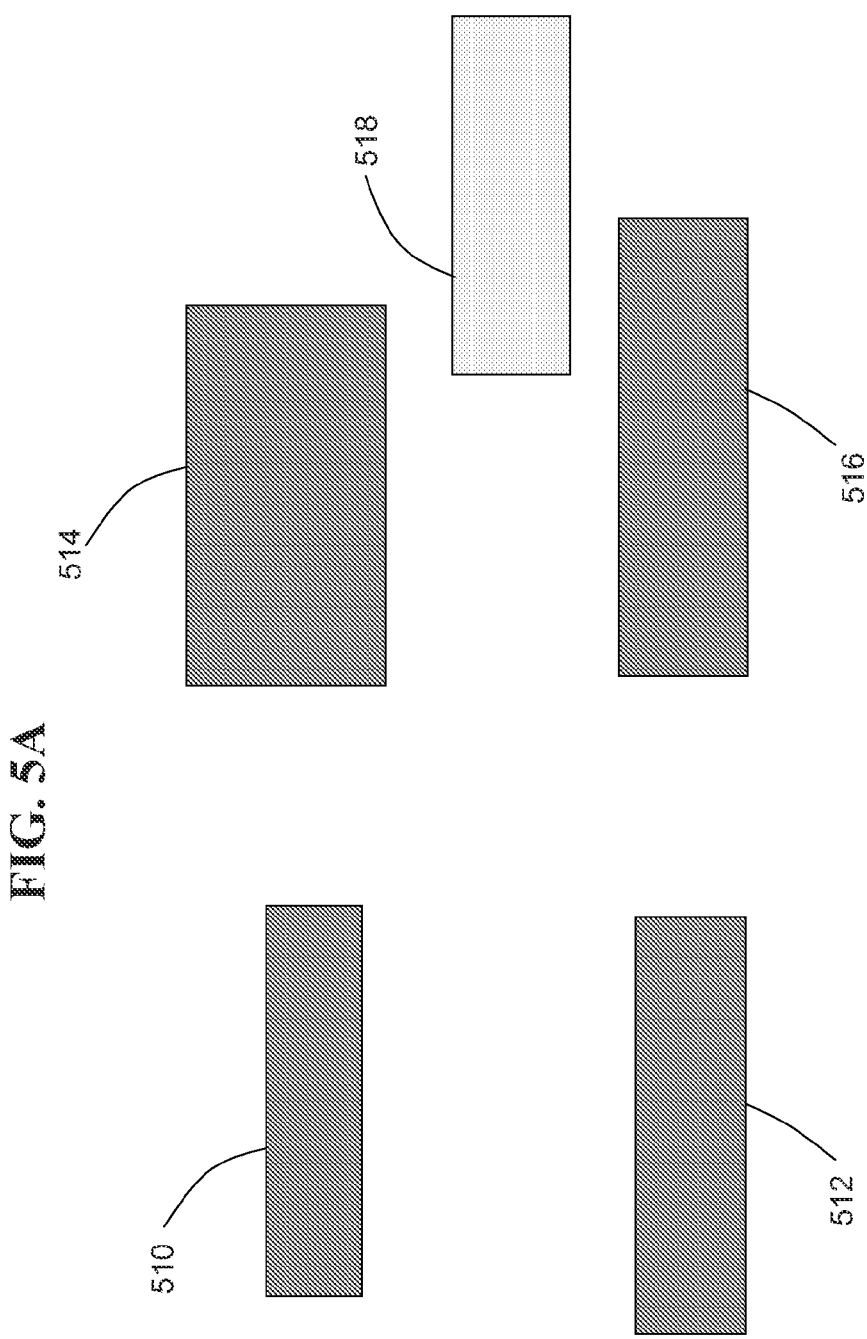

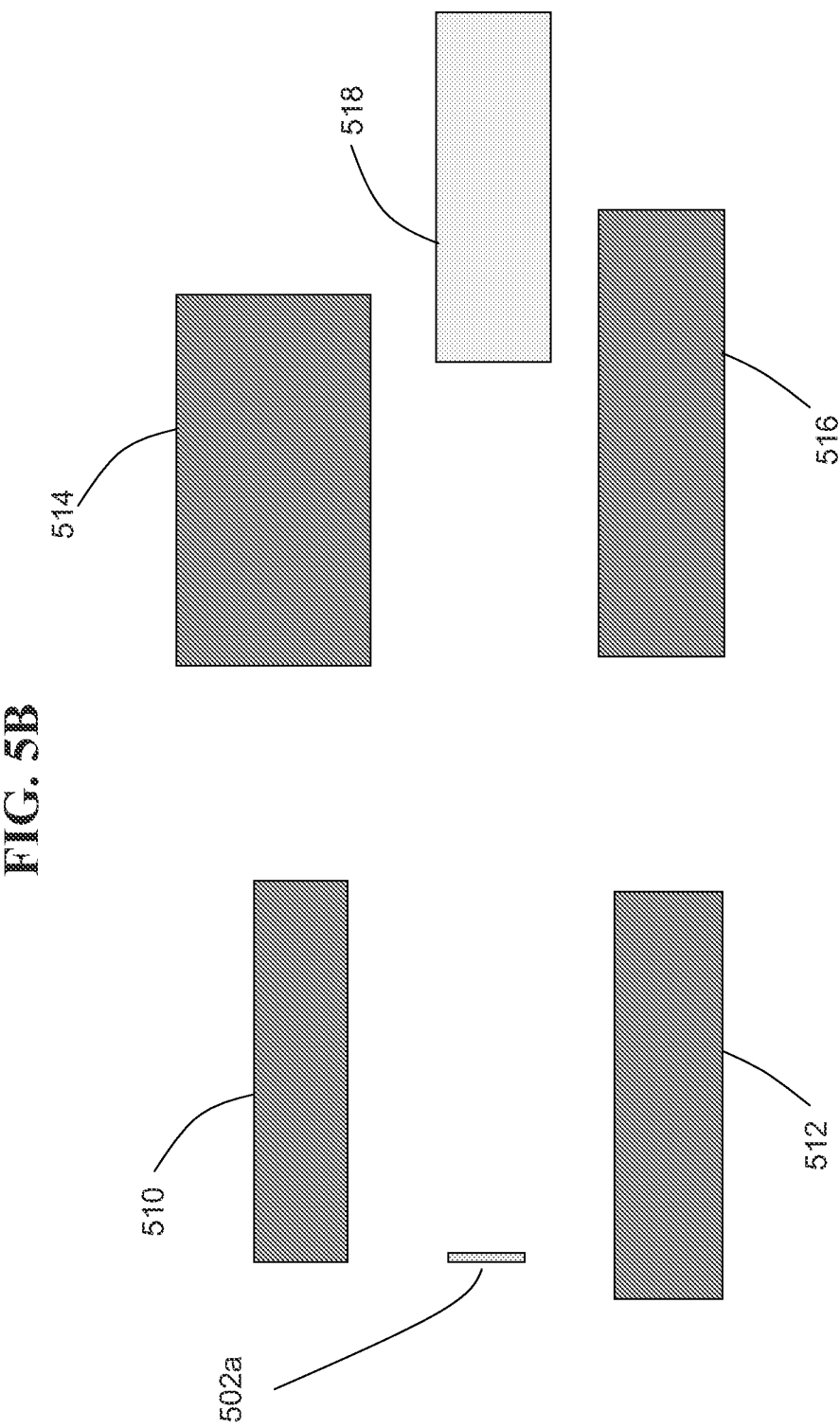

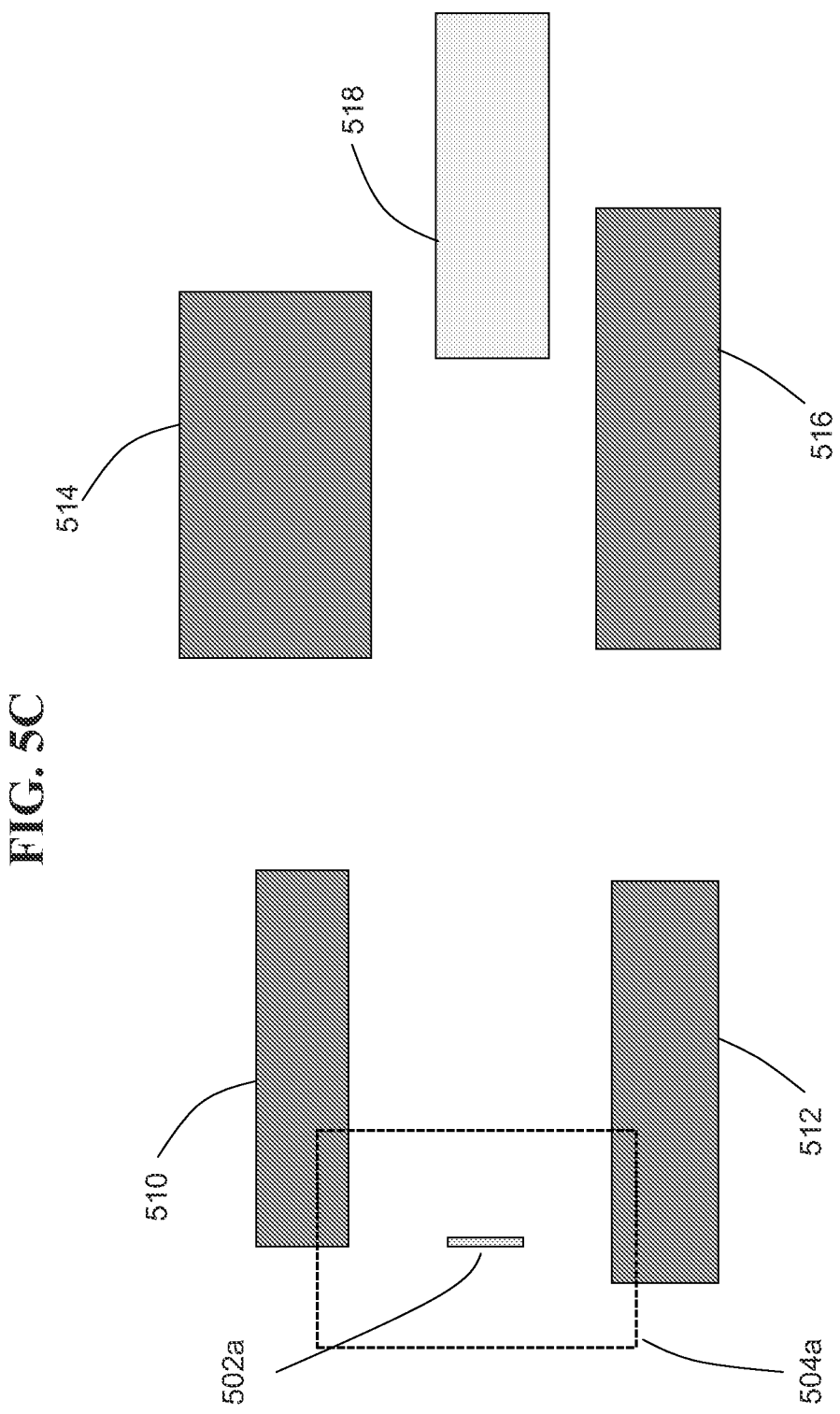

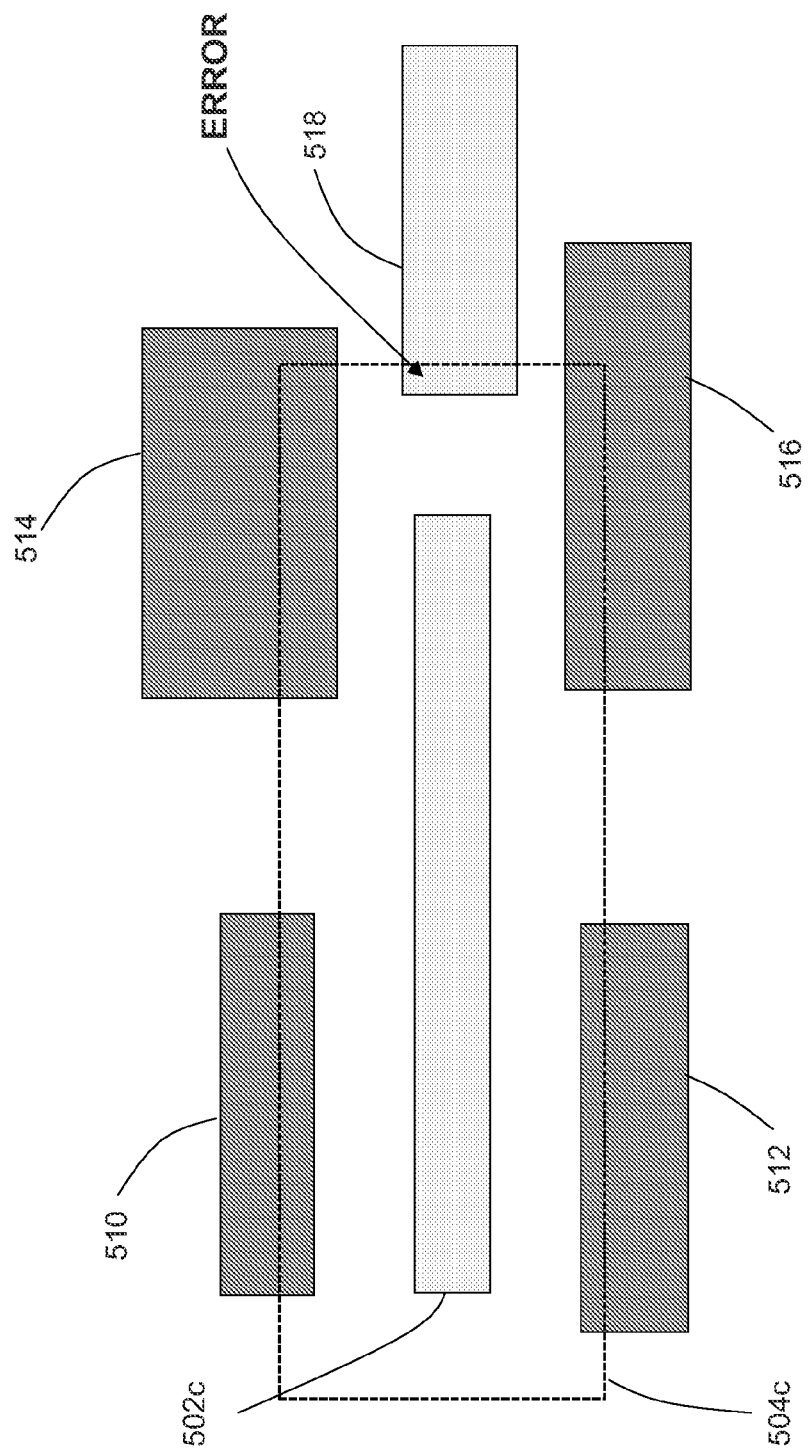

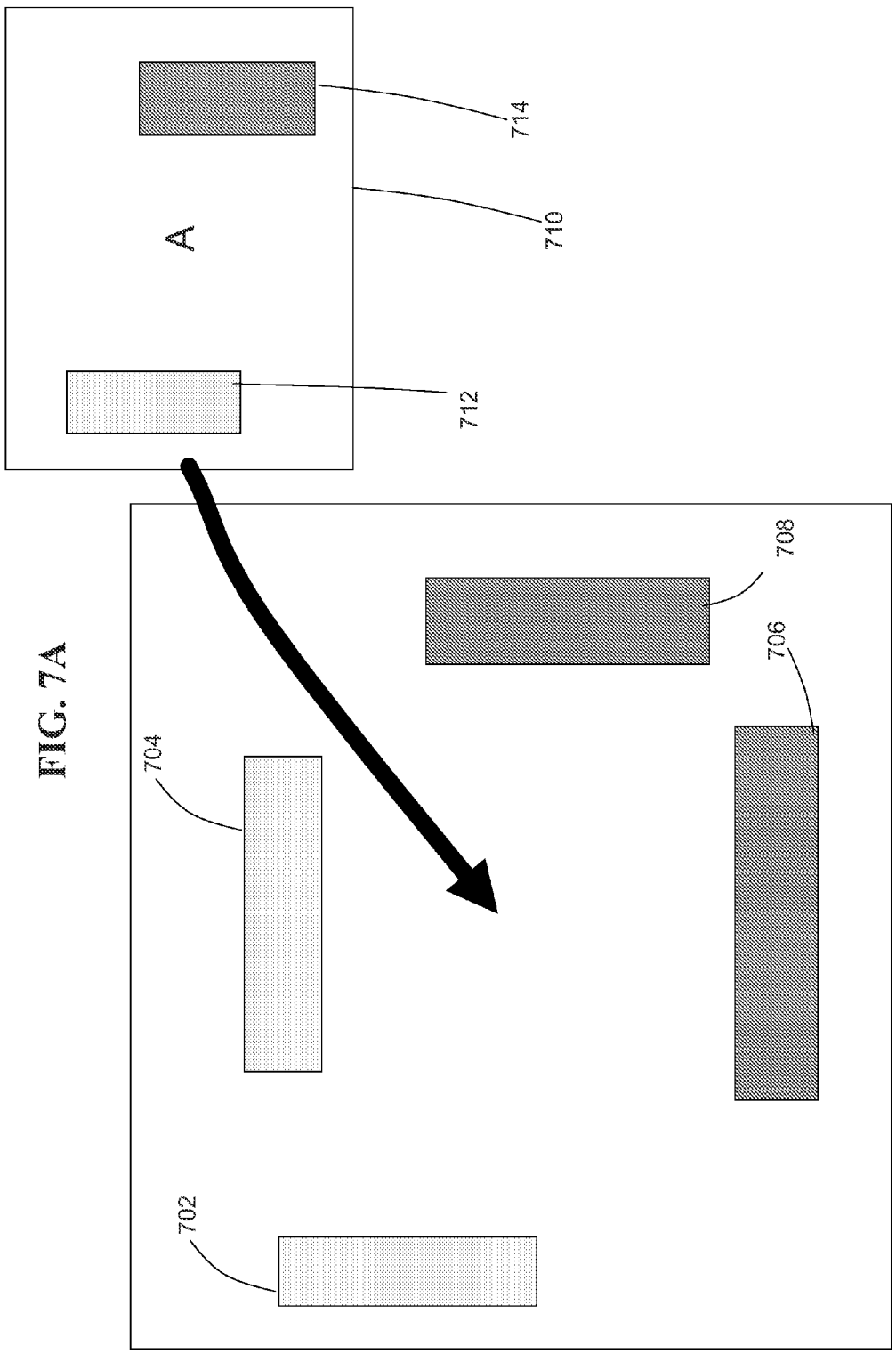

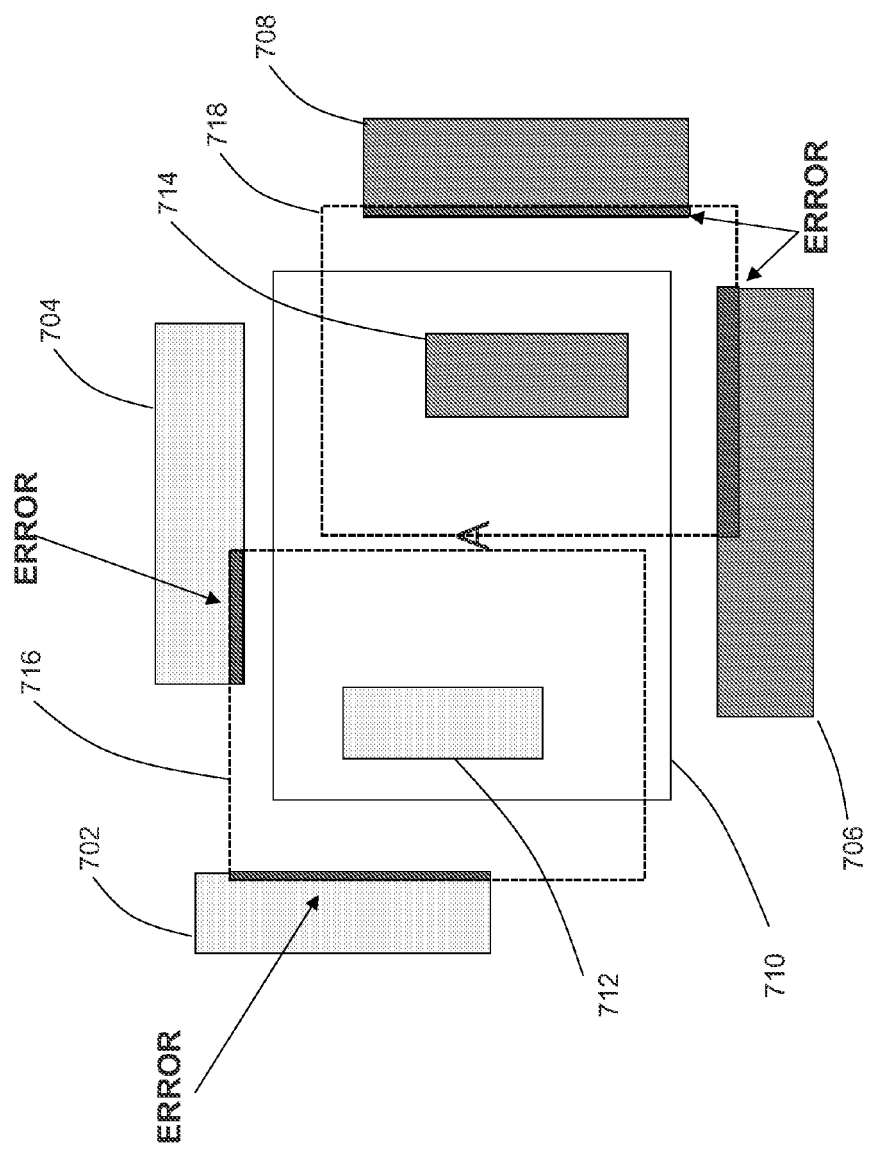

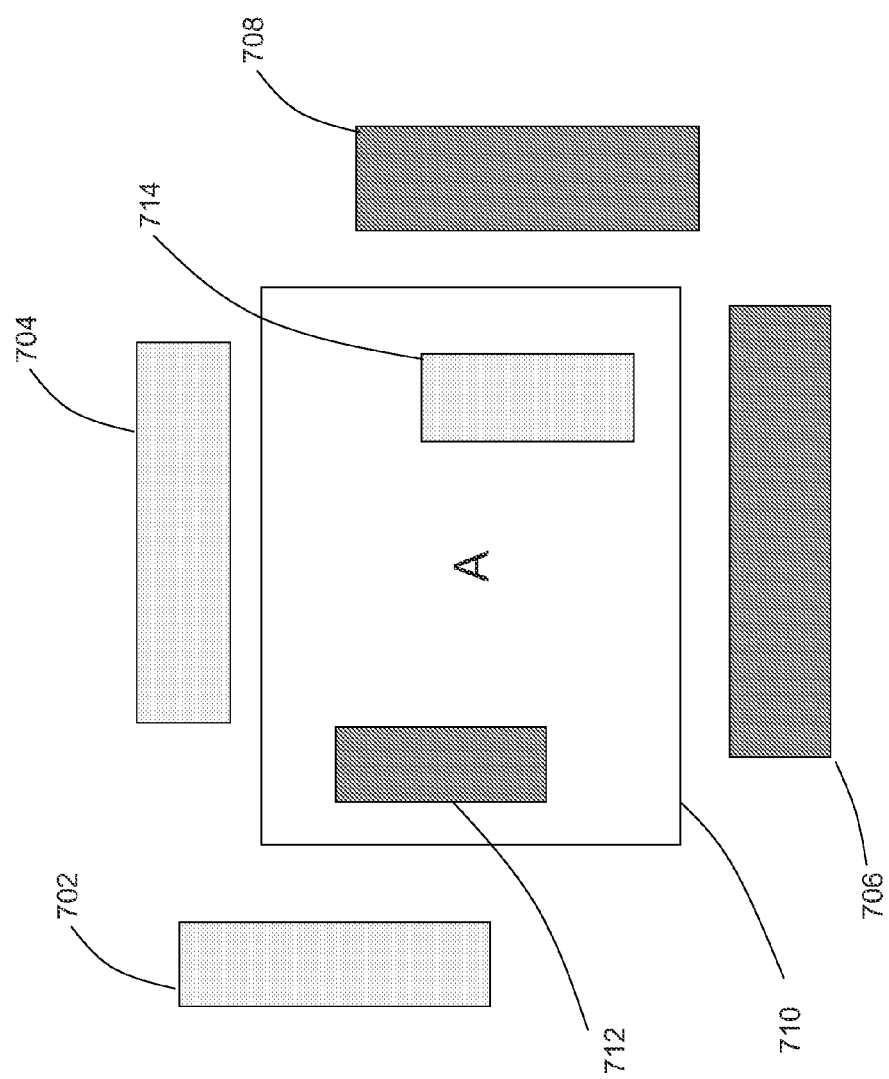

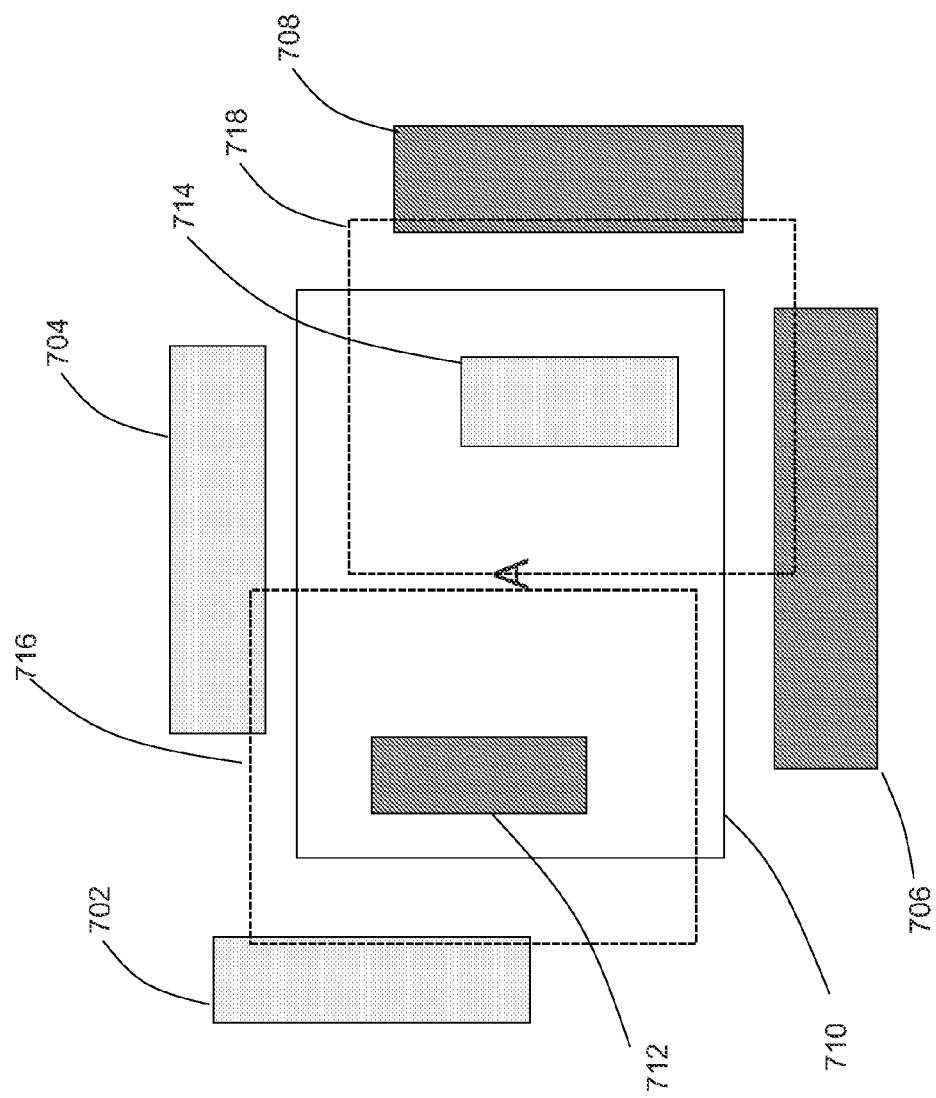

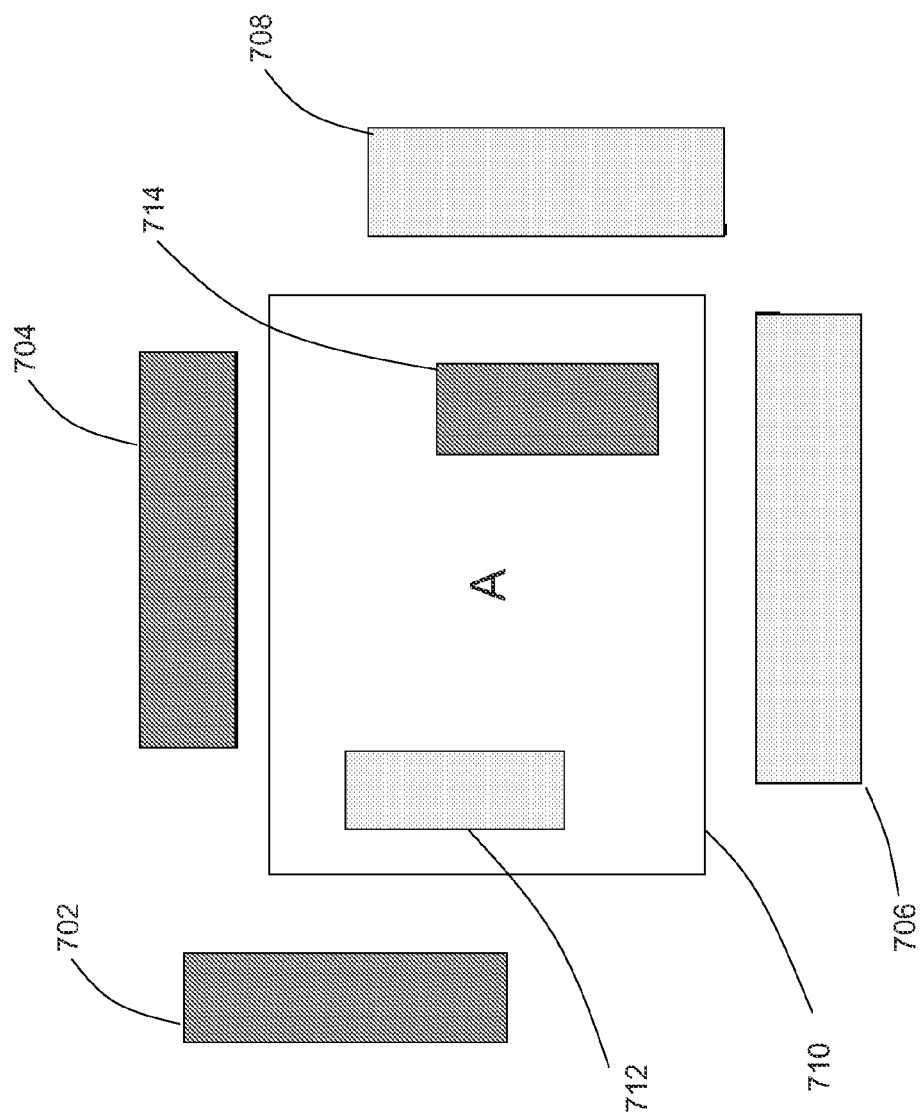

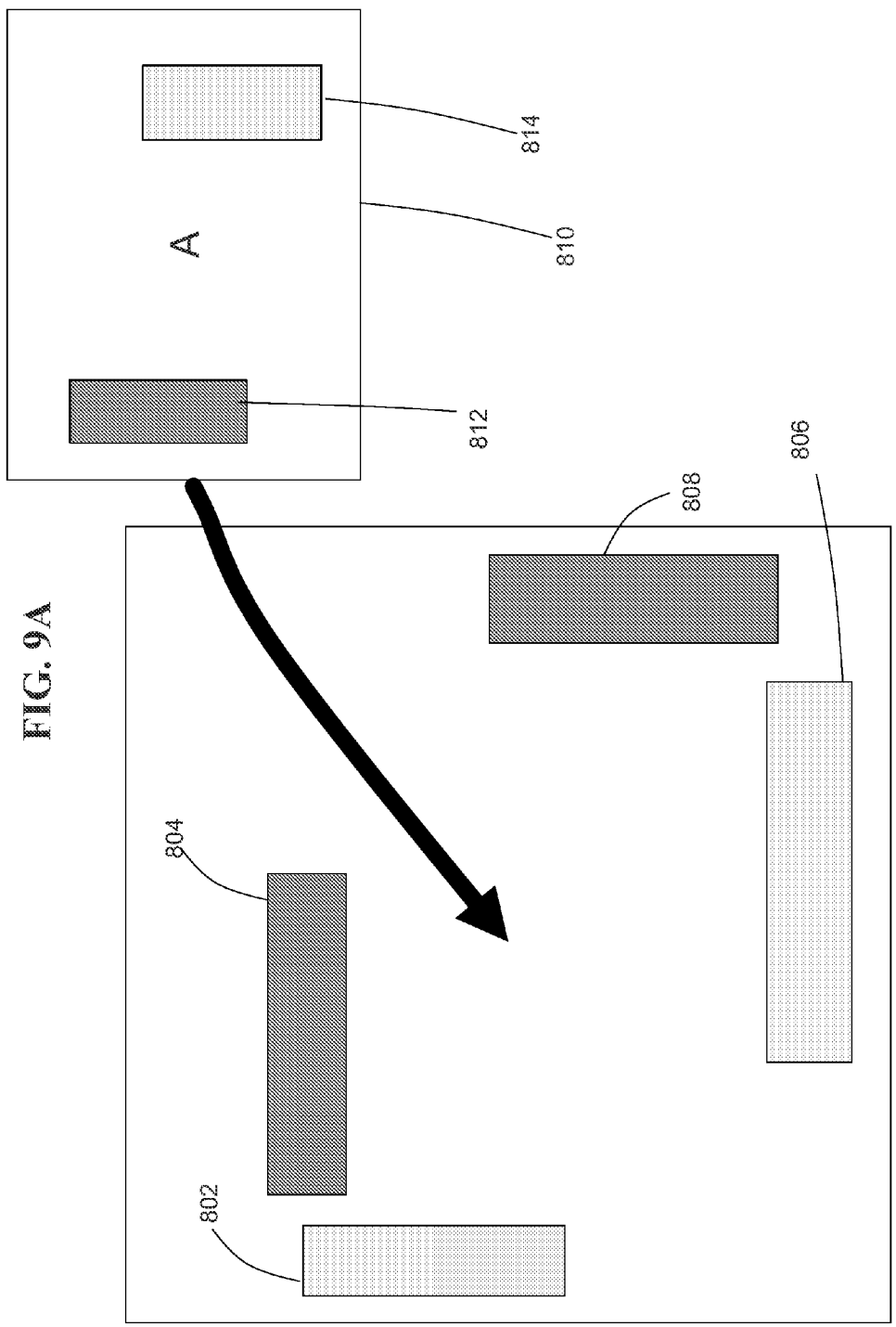

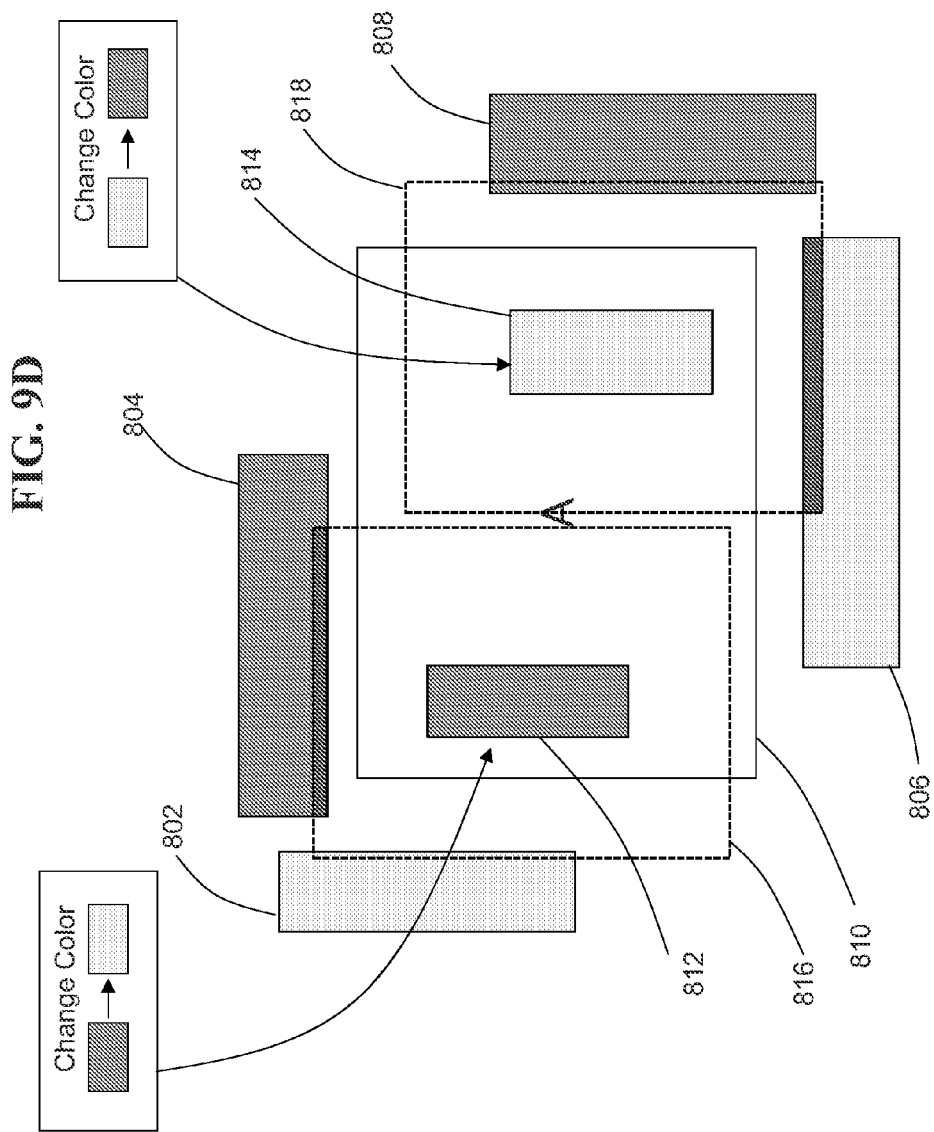

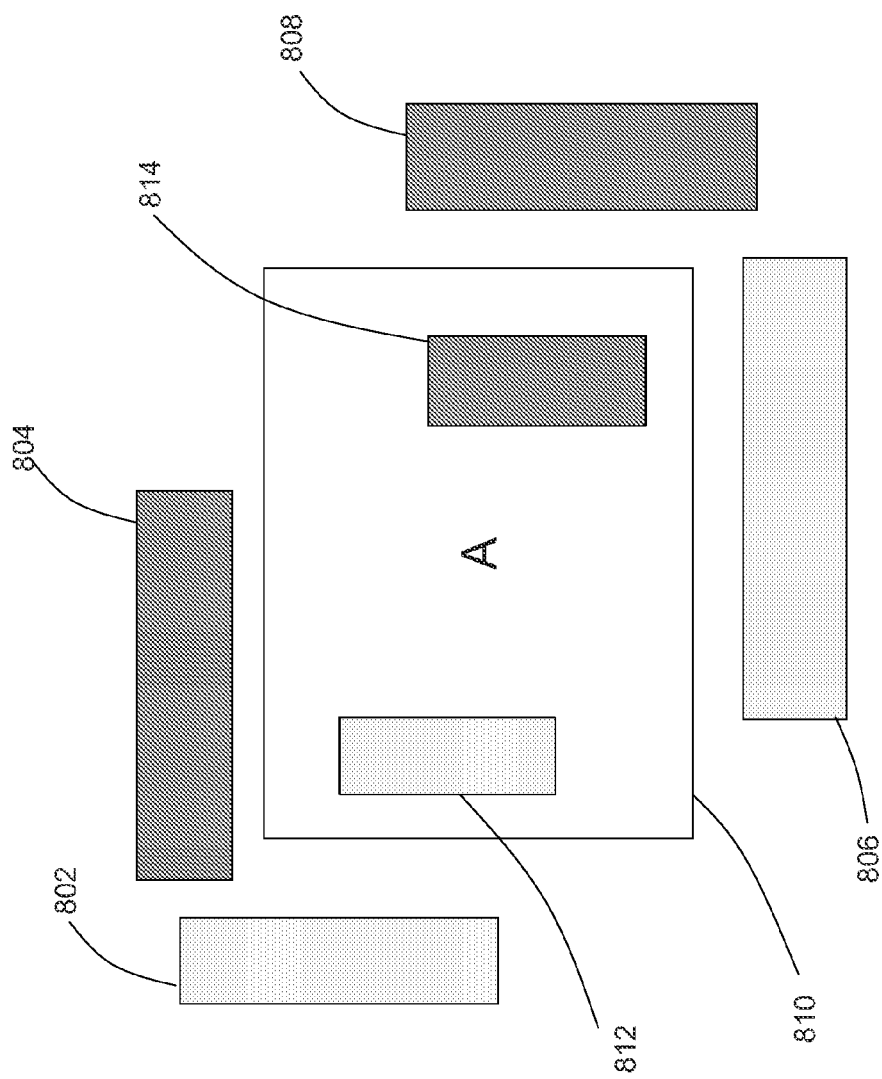

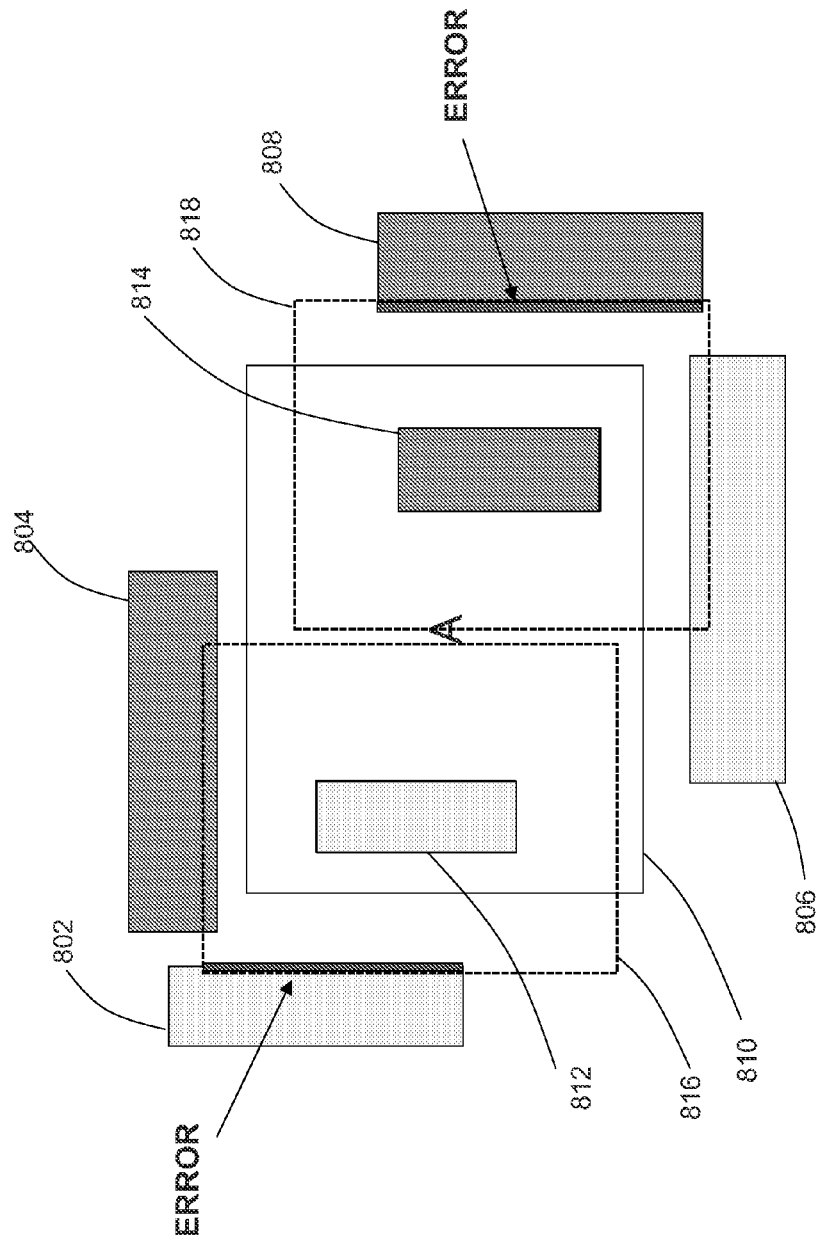

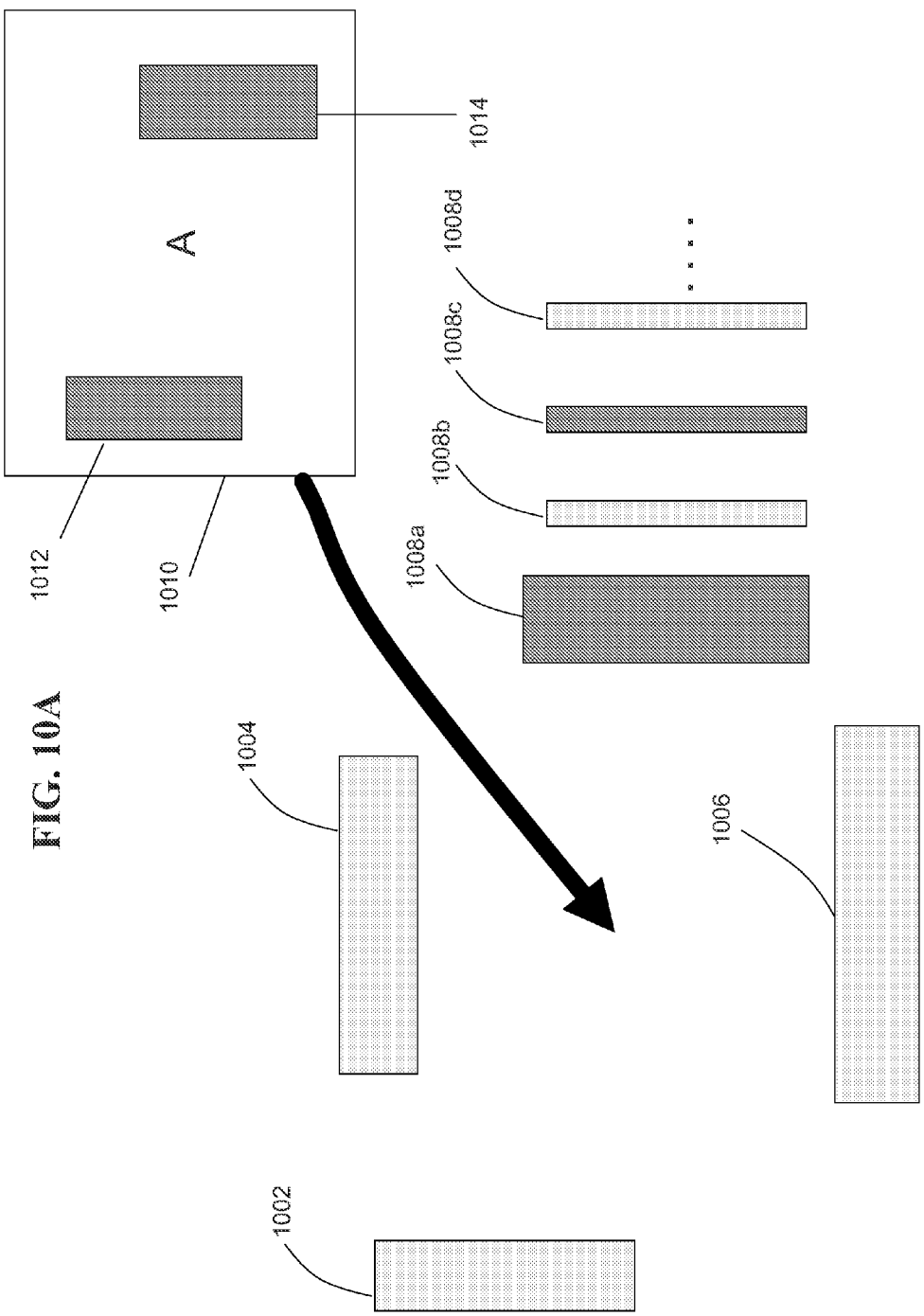

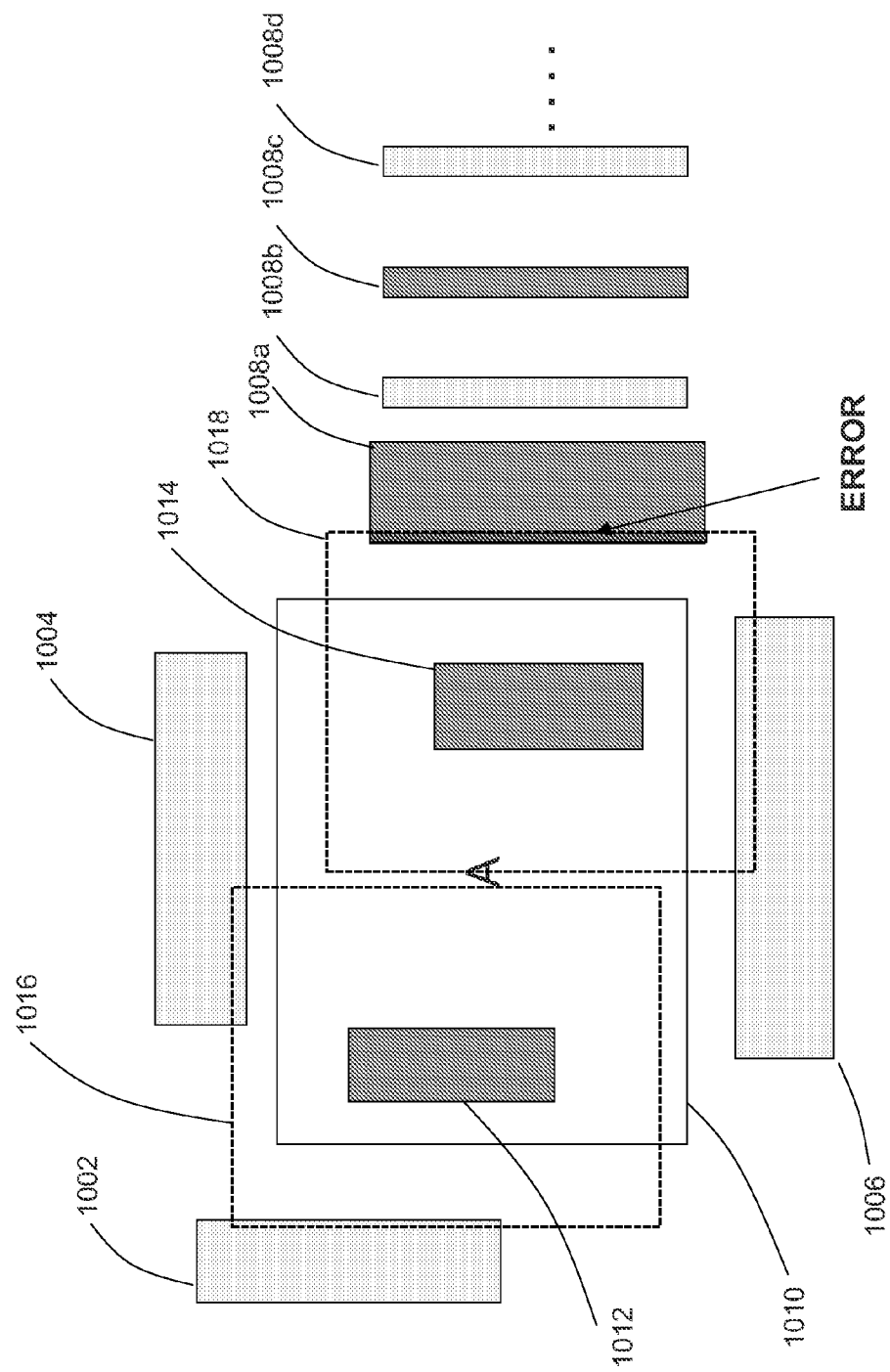

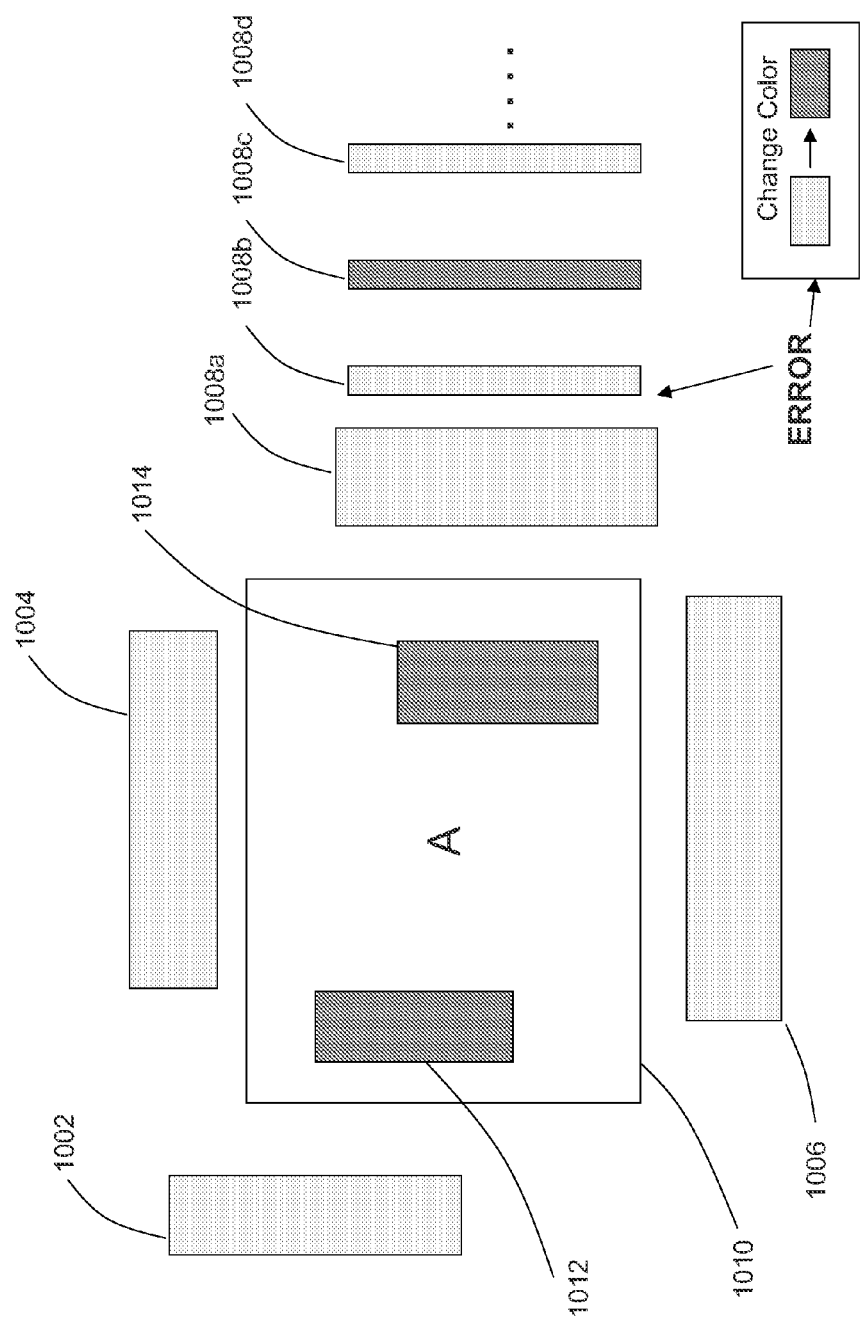

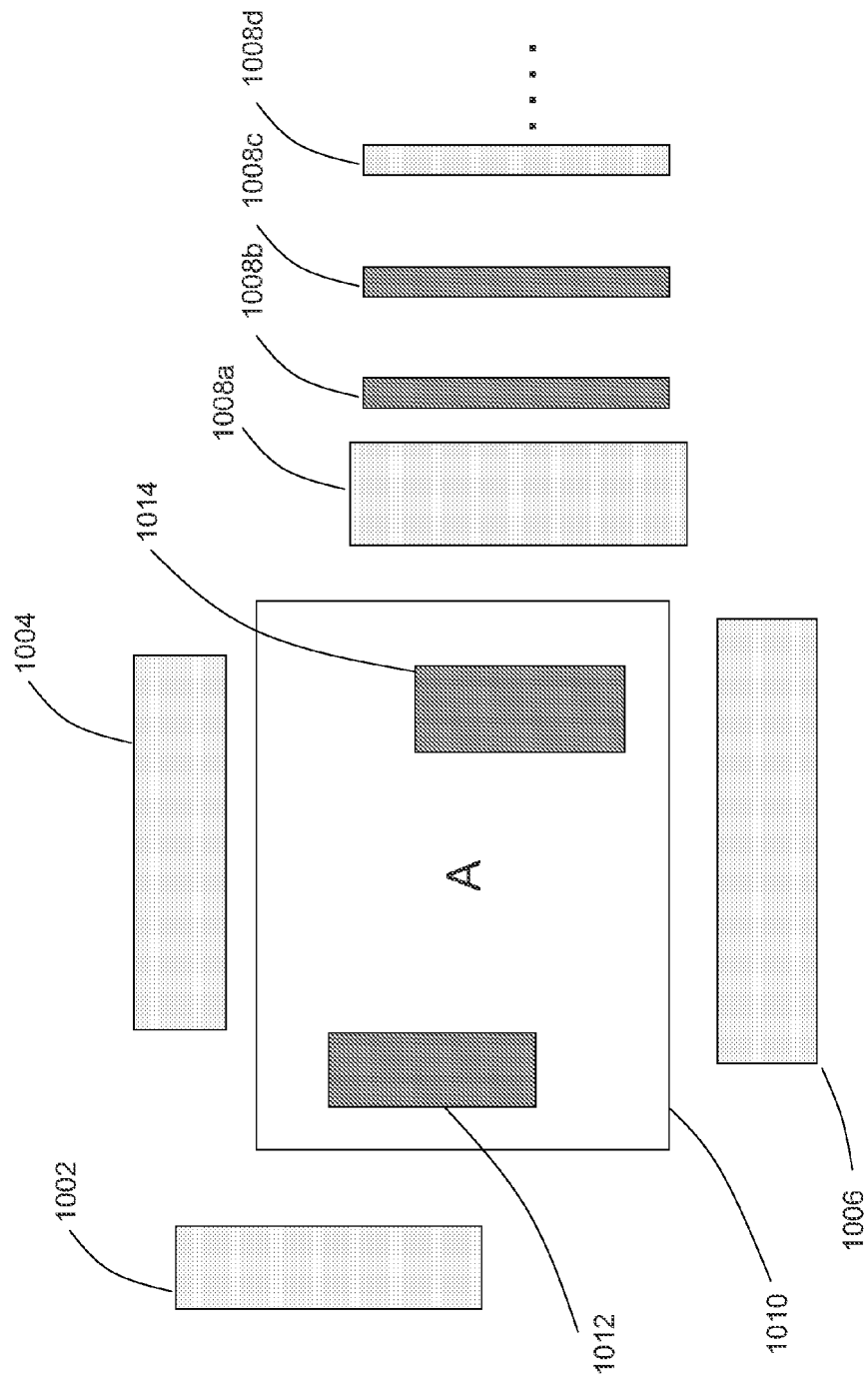

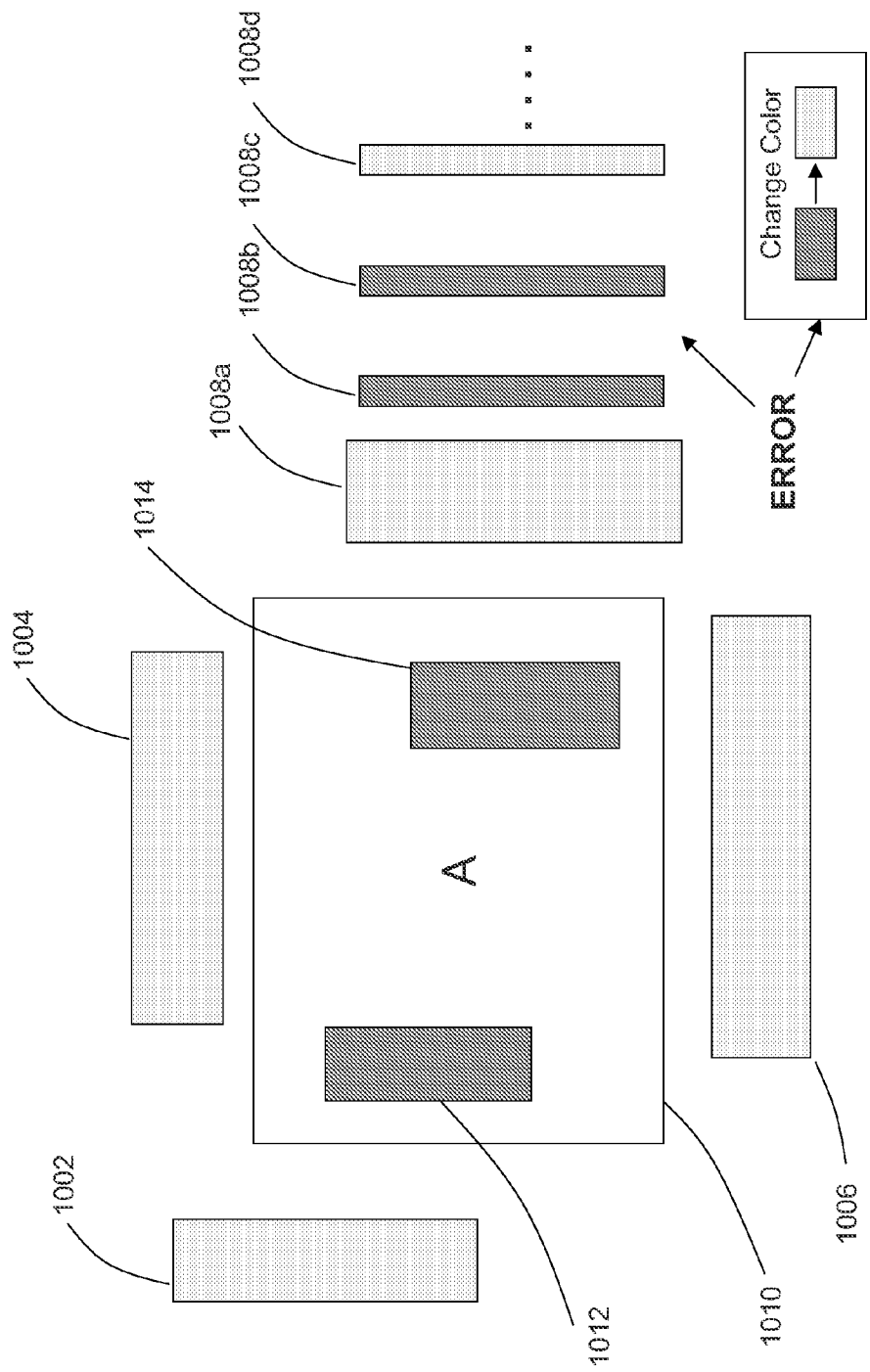

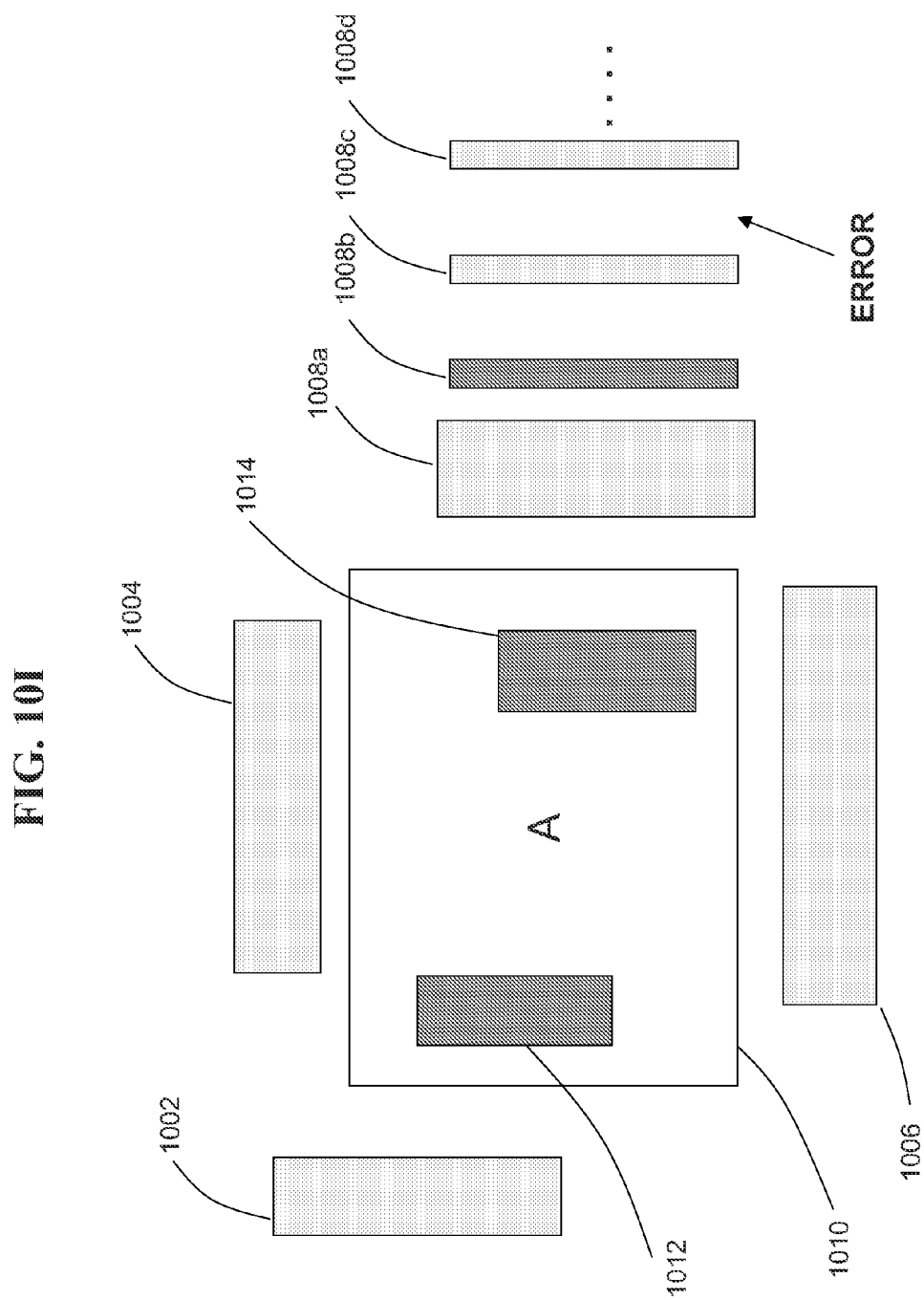

METHOD, SYSTEM, AND PROGRAM PRODUCT FOR INTERACTIVE CHECKING FOR DOUBLE PATTERN LITHOGRAPHY VIOLATIONS

TECHNICAL FIELD

This invention concerns electronic design automation for performing interactive checking of electronic designs with regard to double pattern lithography violations.

DESCRIPTION OF THE RELATED ART

Integrated circuits, or ICs, are created by patterning a substrate and materials deposited on the substrate. The substrate is typically a semiconductor wafer. The patterned features make up devices and interconnections. This process generally starts with a designer creating an integrated circuit by hierarchically defining functional components of the circuit using a hardware description language. From this high-level functional description, a physical circuit implementation dataset is created, which is usually in the form of a netlist. This netlist identifies logic cell instances from a cell library, and describes cell-to-cell connectivity.

A layout file is then created using the netlist. This is accomplished through a placing and routing process, which assigns logic cells to physical locations in the device layout and routes their interconnections. The physical layout is typically described as many patterned layers, and the pattern of each layer is described by the union of a set of polygons. The layout data set is stored, for example in GDSII ("Graphic Data System II") or OASIS ("Open Artwork System Interchange Standard") formats. Component devices and interconnections of the integrated circuit are constructed layer by layer. A layer is deposited on the wafer and then it is patterned using a photolithography process and an etch process. One or more photomasks are created from the layout file for the photolithography of each layer. Photomasks are used to transfer the layout pattern onto the physical layer on the wafer. A photomask, or mask, provides an image of the desired physical geometries of the respective integrated circuit layer. Passing light through the mask projects the layout pattern for the layer onto the wafer. An imaging lens system projects and focuses the layout onto the substrate. The projected light pattern interacts with a photosensitive resist coating on the wafer and, resist portions that are exposed to light are rendered either soluble or insoluble in a developer solution, depending on the type of the photoresist. Accordingly, the mask pattern is transferred into the photo-resist by optical projection and chemical reactions. The photo-resist pattern is subsequently transferred to an underlying layer by an etch process. Most commonly, plasma containing chemically-selective reactive ions is used to etch high-aspect ratio trenches and holes with close to vertical sidewalls.

Many phases of these electronic design activities may be performed with computer aided design (CAD) tools or electronic design automation (EDA) systems. For example, an integrated circuit designer may use a set of layout EDA application programs, such as a layout editor, to create a physical integrated circuit design layout from a logical circuit design. The layout EDA application uses geometric shapes of different materials to create the various electrical components on an integrated circuit and to represent electronic and circuit IC components as geometric objects with varying shapes and sizes. After an integrated circuit designer has created an initial integrated circuit layout, the integrated circuit designer then verifies and optimizes the integrated circuit layout using a set of EDA testing and analysis tools. Verification may include, for example, design rule checking to verify compliance with rules established for various IC parameters. The EDA layout editing tools are often performed interactively so that the designer can review and provide careful control over the details of the electronic design.

With a continuing desire to provide greater functionality in smaller packages and the evolution of system-on-chip and mixed-signal designs, IC feature geometries are being driven to smaller and smaller dimensions. However, the ability to project an accurate image of increasingly smaller features onto the wafer is limited by the wavelength of the light used, and the ability of the lens system.

For deep sub-micron semiconductor manufacturing process, such as processes at feature sizes of 22 nm and below, the layout geometries on a single layer normally cannot be printed on silicon with a single lithography mask except with great difficulty and/or manufacturing defects/problems. To address this problem, the combination of two masks can be used to create the geometries for a single layer. This approach is often referred to as "double pattern" or "double patterning" technology.

While this new technology theoretically may be used to manufacture semiconductor devices, EDA tools do not yet exist which can be used to interactively design and check double patterning designs. For example, conventional tools do not have the ability to interactively track the division of a single layer of the design into multiple masks/patterns for double patterning, and to interactively check the feasibility of mask making for lithography purposes during layout editing. Instead, the current existing approaches are used for batch mode checking of drawn geometries. However, this batch-based approach requires the layout editor to finish the creation of all necessary geometries before it can know of the possible violations for mask making. Therefore, the batch-based approach is not efficient for layout creation when the layout is interactively created/modified by manual editing.

SUMMARY

Embodiments of the present invention provide a method, apparatus, and program product for performing interactive layout editing to address double patterning approaches to implement lithography of electronic designs.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

FIG. 4 illustrates a flowchart of an example approach for determining a design violation in a layout that has been implemented for double pattern lithography.

FIGS. 5A-G illustrates detection of design violations in a layout that has been implemented for double pattern lithography.

FIGS. 7A-F illustrates resolution of a design violation in a layout that has been implemented for double pattern lithography.

FIGS. 8A-C illustrates an alternate resolution of a design violation in a layout that has been implemented for double pattern lithography.

FIGS. 9A-F illustrates a design violation in a layout for double pattern lithography that cannot be resolved.

FIGS. 10A-I illustrates a possible approach to resolve a design violation which may result in negative performance effects for interactive editing.

DETAILED DESCRIPTION OF THE EMBODIMENTS OF THE INVENTION

Embodiments of the present invention provide a method, apparatus, and program product for performing interactive layout editing to address double patterning approaches to implement lithography of electronic designs. A feature of an embodiment of the present invention is to perform spatial query around the shape(s) being created during editing with the distance of allowed spacing in a single mask. If a design error is encountered, corrective editing may occur to correct the error. The present approach can be configured to allow the error detection and corrective actions to be performed interactively.

To explain the problem being addressed by embodiments of the invention, consider that the minimum feature size that a projection system can print can be expressed by:

$$CD = k_1 \frac{\lambda}{NA}$$

where CD, critical dimension, is the minimum feature size; $k_1$ is a dimensionless coefficient of process-related factors; A is the wavelength of light used; and NA is the numerical aperture of the projection lens as seen from the wafer. The equation above is not a black-and-white absolute limit. The yield of the lithographic process gradually decreases, and its cost increases, as $k_1$ decreases below 0.35. Reducing $k_1$ below 0.28 for a single exposure is not practical. There is a fundamental, hard limit for the pitch of a periodic pattern:

$$\text{Period} \geq 0.5 \frac{\lambda}{NA}$$

The pitch limit cannot be violated, irrespective of the photo-mask and resolution enhancement technologies that may be used, when using a resist employing a single-photon reaction. The reason for this limitation is that the optical intensity image produced inside the photo-resist is band-limited in the spatial-angular-frequency domain. When the intensity image is Fourier transformed with respect to the x and y coordinates (coordinates in the plane of the wafer), the support of the transformed intensity image is contained in a disk of radius $4\pi NA/\lambda$. Patterns that can be printed by a single lithography step are approximately level curves of such band-limited functions.

Figure 1:
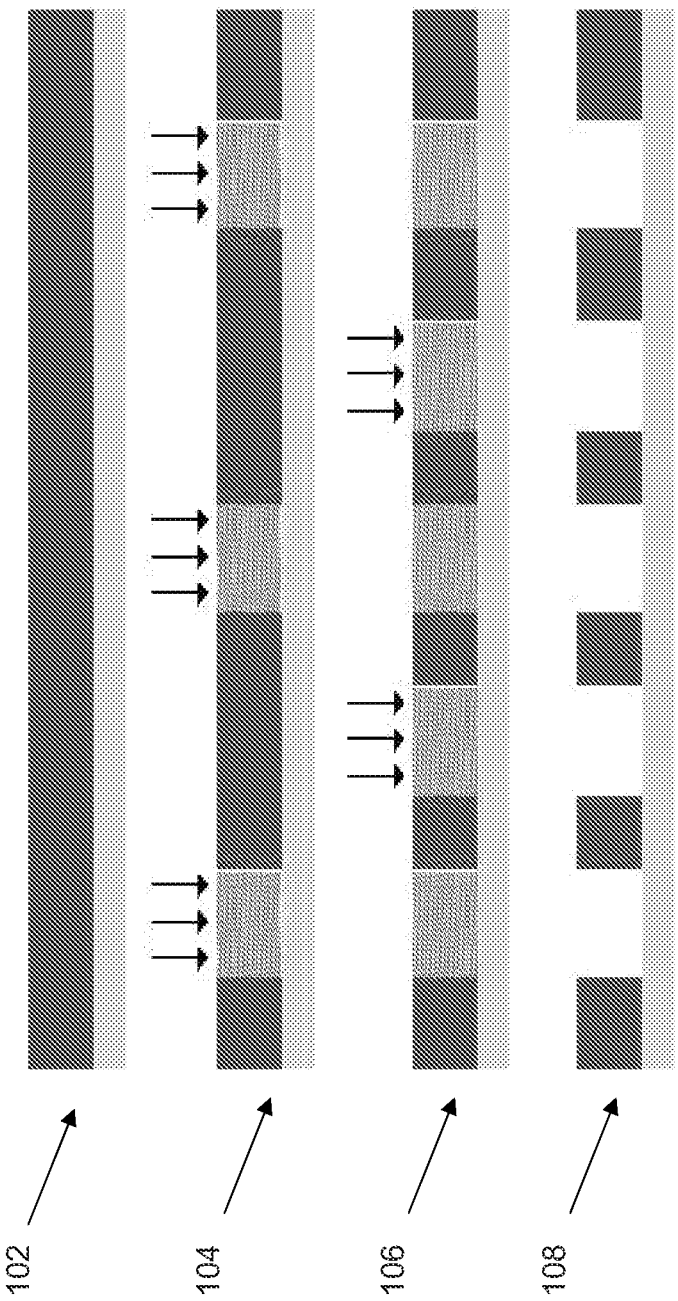
FIG. 1 shows an example approach to implement double pattern lithography.

FIG. 1 illustrates how double patterning technology can be used to address this problem. Portion 108 shows the final, pattern that is desired for a layer of an electronic design. For the purposes of this example, it is assumed that the distance between the shapes in pattern 108 are too close together to be printed with a single mask, due the pitch-related issued described above.

To address this, double patterning is used to print the pattern 104 using multiple masks with sequential lithography steps. The starting materials for the IC layer are shown at 102. A first mask is used to lithographically create the pattern shown in 104, where the shapes in pattern 104 are spaced far enough apart such that they can be printed with a single mask. A second mask is than used to lithographically create the pattern shown in 106, where again the shapes in pattern 106 are spaced far enough apart to be printed with the second mask. The combination of using the first mask to create the first pattern 104 and then using the second mask to create the second pattern 106 allows the final product to have the pattern shown in 108.

Figure 2:
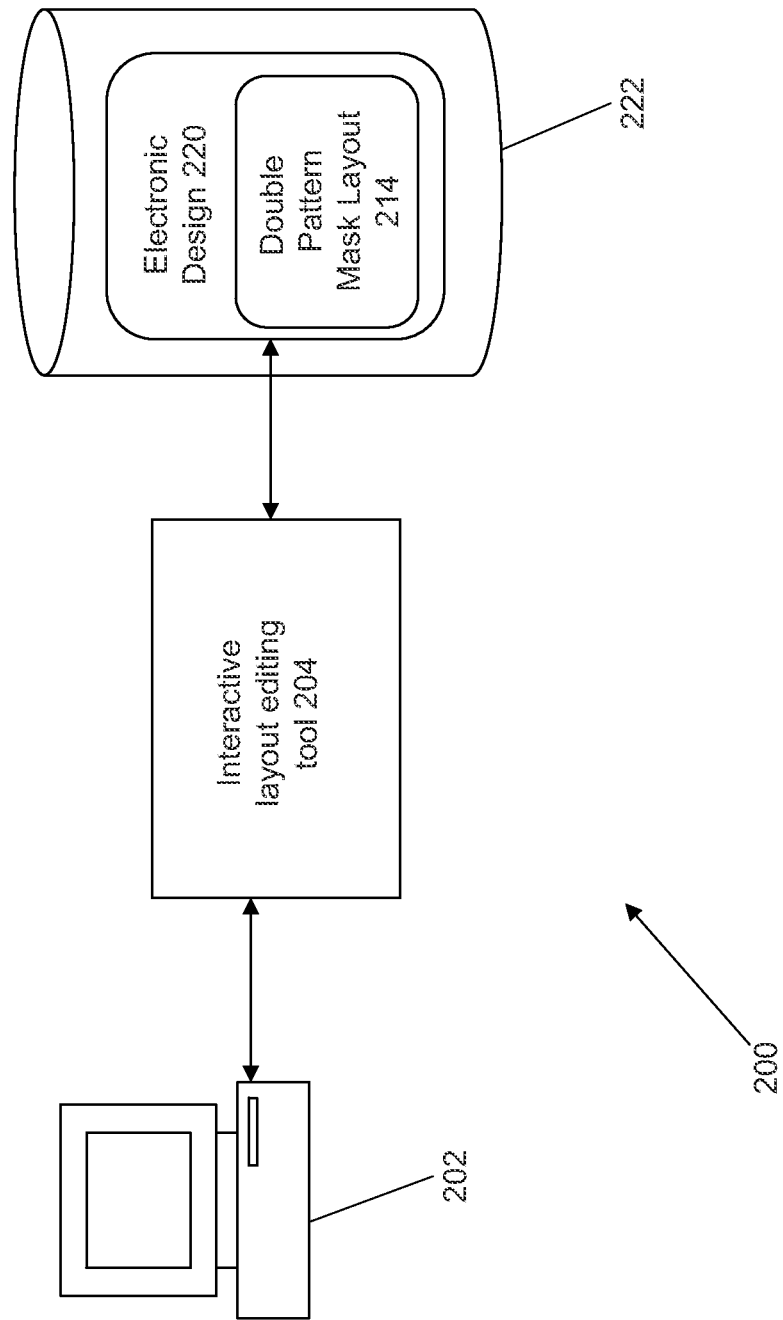
FIG. 2 illustrates an example system for performing interactive layout editing for double pattern lithography.

FIG. 2 illustrates an example system 200 which may be employed in some embodiments of the invention to perform interactive editing of layouts for double patterning. System 200 may include one or more users at one or more user stations 202 that operate the system 200 to design or edit electronic designs 220. Such users include, for example, design engineers or verification engineers. User station 202 comprises any type of computing station that may be used to operate, interface with, or implement EDA applications or devices. Examples of such user stations 202 include for example, workstations, personal computers, or remote computing terminals. User station 202 comprises a display device, such as a display monitor, for displaying electronic design layouts and processing results to users at the user station 202. User station 202 also comprises one or more input devices for the user to provide operational control over the activities of system 200, such as a mouse or keyboard to manipulate a pointing object in a graphical user interface.

The electronic designs 220 comprising a layout 214 implemented with double patterning technology may be stored in a computer readable storage device 222. Computer readable storage device 222 comprises any combination of hardware and software that allows for ready access to the data that is located at the computer readable storage device 222. For example, computer readable storage device 222 could be implemented as computer memory operatively managed by an operating system. The computer readable storage device 222 could also be implemented as an electronic database system having storage on persistent and/or non-persistent storage.

One or more EDA tools, such as an interactive layout editor 204, may be used by users at a user station 202 to interactively access and edit layout 214. According to some embodiments of the invention, spatial queries are performed around the shape being created or modified during editing to check for possible violations of design rules. Possible corrections are reviewed to see if the corrections can be corrected, and corrected in a manner that is suitable for an interactive editor.

Figure 3:
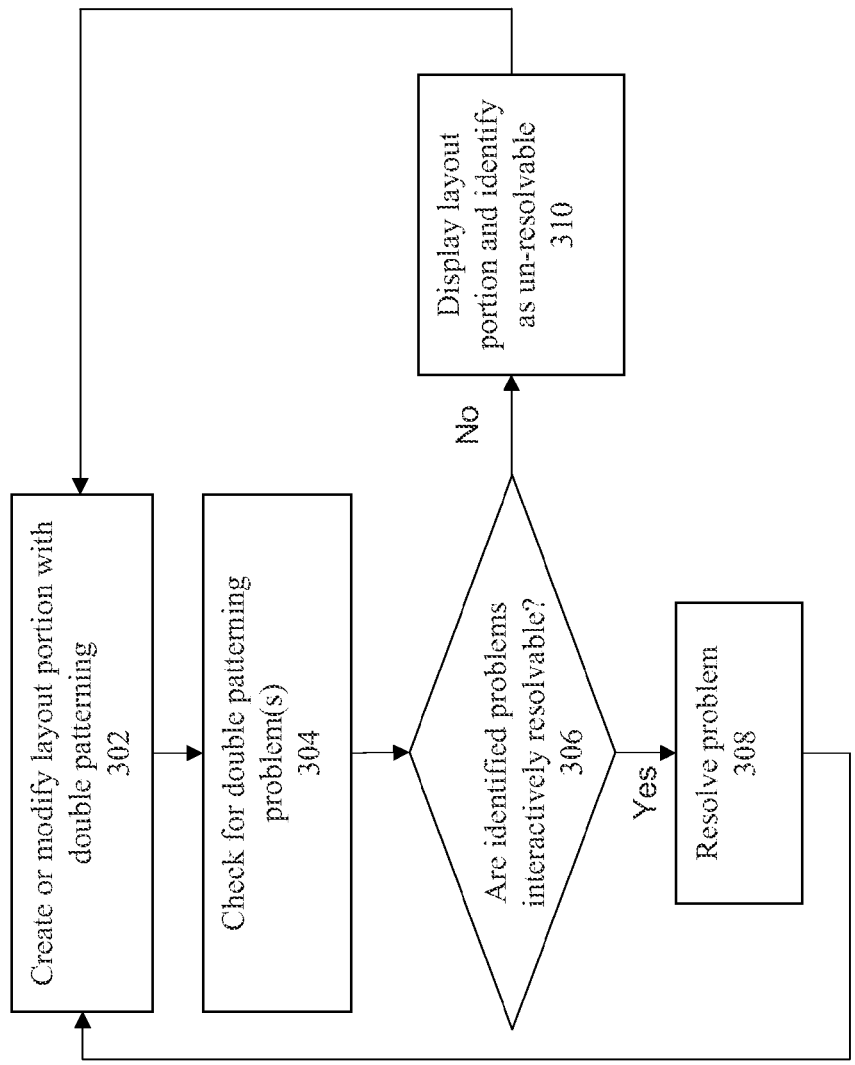
FIG. 3 illustrates a flowchart of an example approach for performing interactive layout editing for double pattern lithography.

FIG. 3 shows a flowchart of an approach for implementing an interactive layout editor for double patterning according to some embodiments of the invention. At 302, some or all of the layout for an electronic design is implemented with double patterning. The layout implementation involves the insertion or modification of one more patterns or shapes in the layout to be manufactured using double patterning technology. This action involves identification and assignment of shapes on the same layer of the design to different lithography masks.

According to some embodiments, assignment of shapes to different masks is based upon the use of "layer purpose pairs" or "LPPs". The term "LPP" refers to the concept that a shape in a modern design may have an associated "layer" and "purpose". The layer usually corresponds to a layer in the design or a mask layer, such as M1, Metal 1, etc. The purpose is a user-definable specification that provides a way to identify or distinguish the shape(s) by its use in the design. For example, a designer may wish to identify or distinguish fill, power, ground, clock, and signal lines in the design, and to have these different LPPs be drawn or displayed in a layout viewer with different colors or other visibly distinguishable patterns. This ability is facilitated by providing the different layers with different purposes, as layer purpose pairs. Inside the design database, the LPP is used as a way to organize the shapes in the design.

For purposes of double pattern manufacturing, shapes on the same layer of the device can be assigned to different LPPs, with a first LPP corresponding to a first double patterning mask and a second LPP corresponding to a second double patterning mask. In general, the multiple masks or LPPs can also be referred to as having different "colors", where the first mask or LPP corresponds to a first color and the second mask or LPP corresponding to a second color. Therefore, to solve manufacturing pitch problems with patterns on an electronic design, some of the shapes associated with the pattern are assigned to a first color and some of the shapes are assigned to a second color, where the shapes for the same color are spaced sufficiently apart from each other to allow printing or manufacturing with intended lithographic manufacturing equipment and processes.

At 304, the layout (or specified portions of the layout) is checked to identify whether the layout implemented with double patterning technology will cause any identifiable manufacturing problems. For example, and as described in more detail below, the layout is checked to see if the layout will cause any spacing problems for manufacturing.

If there are any problems identified in 304, then at 306 a determination is made whether the identified problems can be resolved interactively by the layout editor. For example, and as described in more detail below, possible corrections to the identified problems are checked to see if they are effective and/or can be implemented interactively by an interactive layout editor.

If the problem is resolvable, then the layout is modified at 308 to correct the identified problem. Otherwise, at 310, the interactive editor will provide an indication to the user that the layout problem cannot be resolved with the interactive layout editor and/or will store the analysis results in a computer readable medium.

This document will now describe an approach that uses a spatial query to check that the distances between shapes to see if the spacing distances correspond to permitted spacing parameters for a single mask. In other words, shapes that are inserted for a particular mask should maintain sufficient distances from other shapes to meet manufacturability requirements.

When a new shape is inserted into a design, given that the existing geometries in the layout are already assigned to either one of the two masks for a double pattern, the geometry set created by the spatial query will be checked to determine if all geometries in this set are associated to the same mask. If they are associated to the same mask, the newly created shape will be assigned to the other mask. If they are not associated to the same mask, an error will be flagged.

FIG. 4 shows a flowchart of an approach according to one embodiment of the invention for determining whether a layout or layout portion implemented for double patterning corresponds to a manufacturing problem. At 402, a "halo" corresponding to a minimum spacing distance is drawn around a shape in the layout, where the shape is newly inserted into the design or where the location and/or mask assignment of the shape has recently changed. The minimum spacing distance for the halo corresponds to the minimum spacing distance that must be maintained between shapes for the same mask or color to allow proper manufacturing, e.g., based a spacing rule or a DRC ("design rule check") rule provided by a fabrication facility.

A determination is made at 404 whether the halo intersects another shape on the same layer of the design. If there is such an intersection, then at 406 a further determination is made whether the other shape corresponds to the same color or mask assignment. If the intersection is with another shape having the same color/mask assignment, then at 408, a double patterning problem has been identified. Otherwise, this type of manufacturing problem is not identified, and at 410, an indication can be made that the shape can be inserted without violating a spacing rule for double patterning.

Figure 5D:
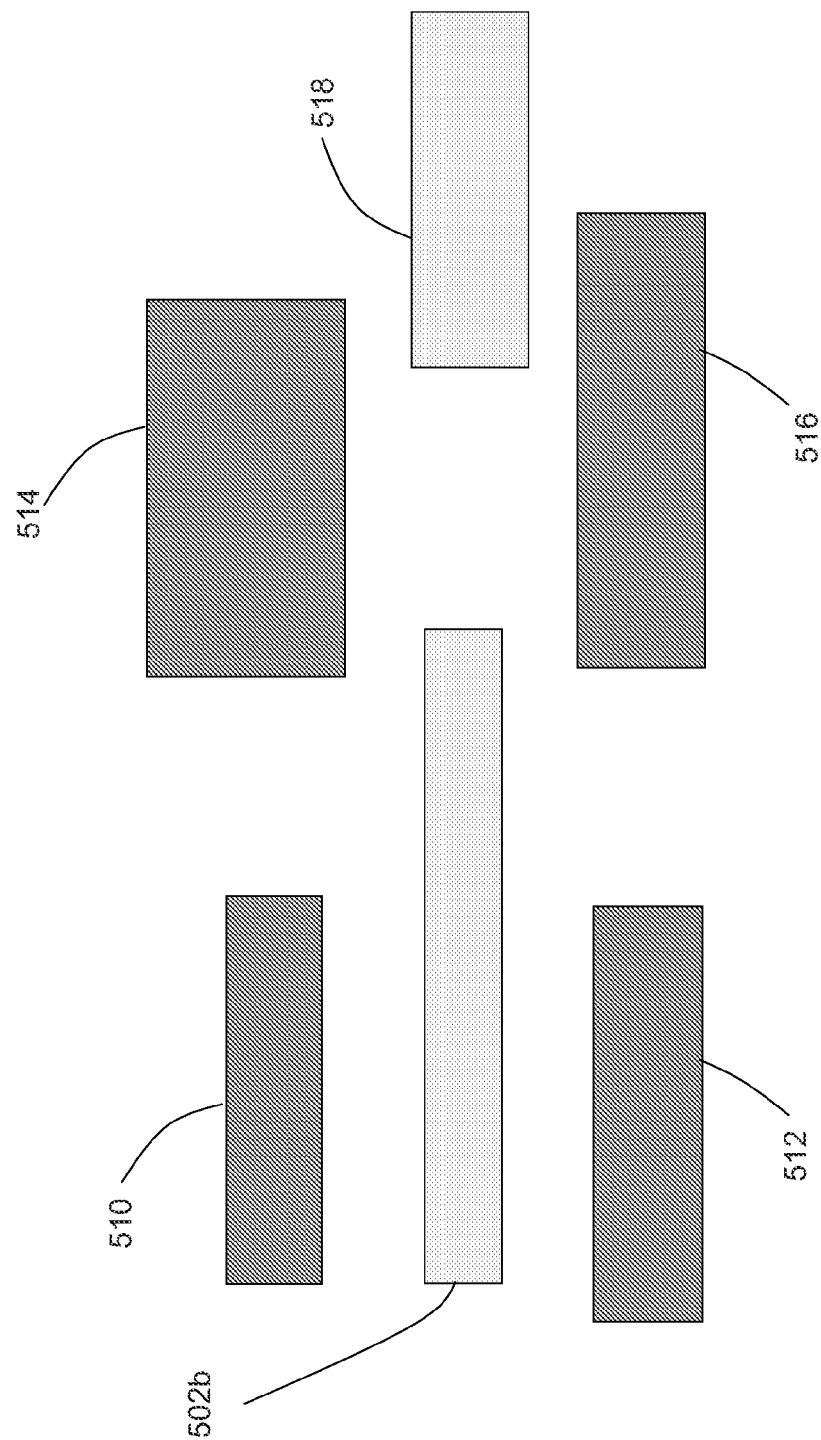

FIGS. 5A-E illustrate this process of identifying spacing rule violations for mask assignments. FIG. 5A shows a set of shapes that are assigned to two masks. The dark colored shapes are assigned to a first mask and the light colored shape is assigned to a second mask. As illustrated in FIG. 5B, assume that it is desired to insert a new shape 502a into this layout portion, and that shape 502a is to be a light colored shape, i.e., shape 502a is to be assigned to the second mask.

As shown in FIG. 5C, a halo 504a is drawn around shape 502a, where the halo corresponds to the minimum spacing distance that must be maintained between a given shape and any other shape for the same color for the design layer, i.e., the minimum spacing distance between two shapes having the same mask assignment. For this particular example, it can be seen that halo 504a surrounding shape 502a does intersect other shapes in the design. In particular, the halo 504a intersects shapes 510 and 512. This indicates that shapes 510 and 512 are closer than the minimum spacing distance to new shape 502a, which would create a possible manufacturing problem if shapes 502a, 510, and 512 all correspond to the same color/mask assignment. However, since shapes 510 and 512 correspond to a dark color and shape 502a corresponds to a light color, this means that shape 502a is assigned to a different mask from shapes 510 and 512. Therefore, the halo intersection can be ignored and an indication can be made that this configuration does not violate a double patterning spacing rule.

Figure 5E:
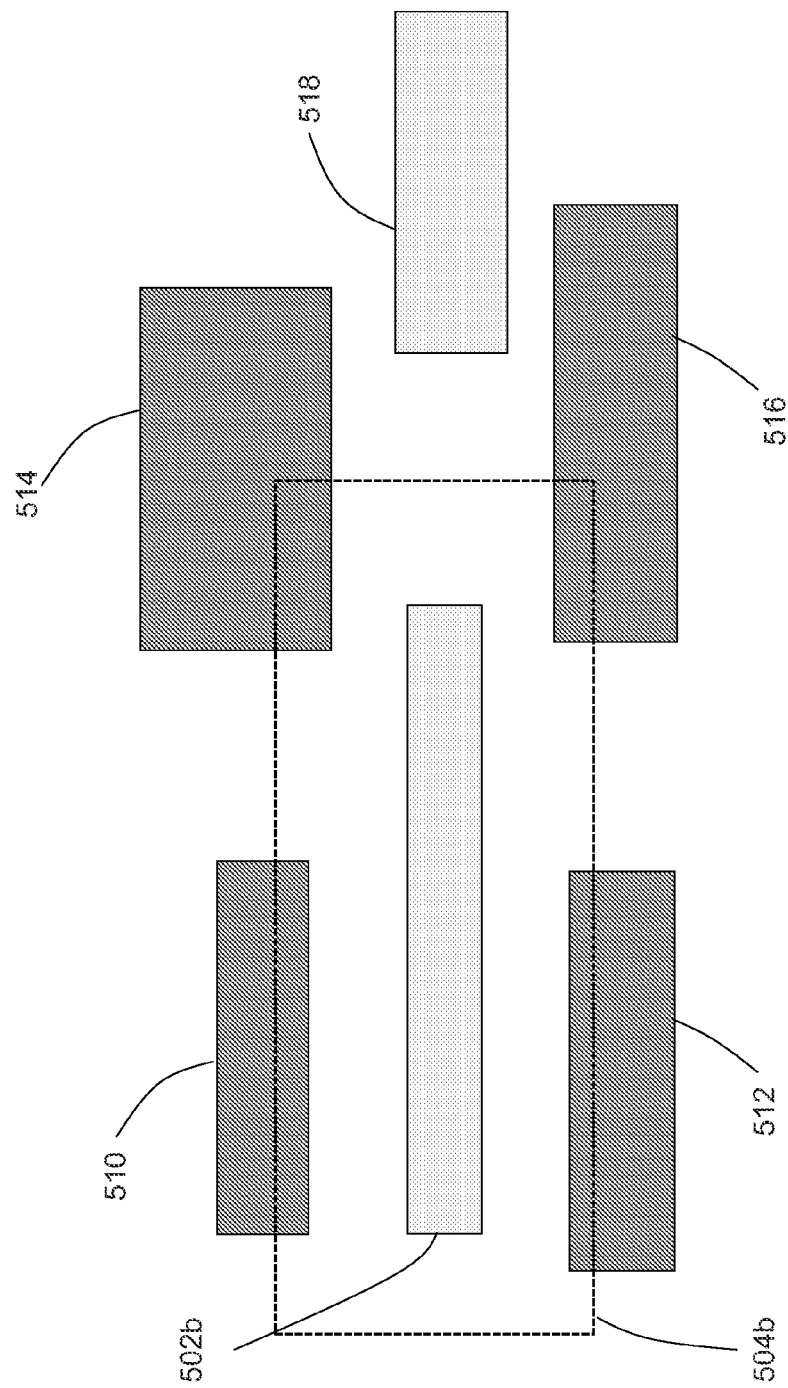

FIG. 5D shows another example where new shape 502b is created with larger dimensions than shape 502a, and hence when a halo 504b is drawn as shown in FIG. 5E, the halo now intersects four shapes 510, 512, 514, and 516. This indicates that shapes 510, 512, 514, and 516 are closer than the minimum spacing distance to new shape 502b, which would create a possible manufacturing problem if shapes 502b, 510, 512, 514, and 516 all correspond to the same color/mask assignment. However, like the previous example, since shapes 510, 512, 514, and 516 correspond to a dark color and shape 502b corresponds to a light color, this means that shape 502b is assigned to a different mask from shapes 510, 512, 514, and 516. Therefore, the halo intersection can be ignored and an indication can be made that this configuration does not violate a double patterning spacing rule.

Figure 5F:
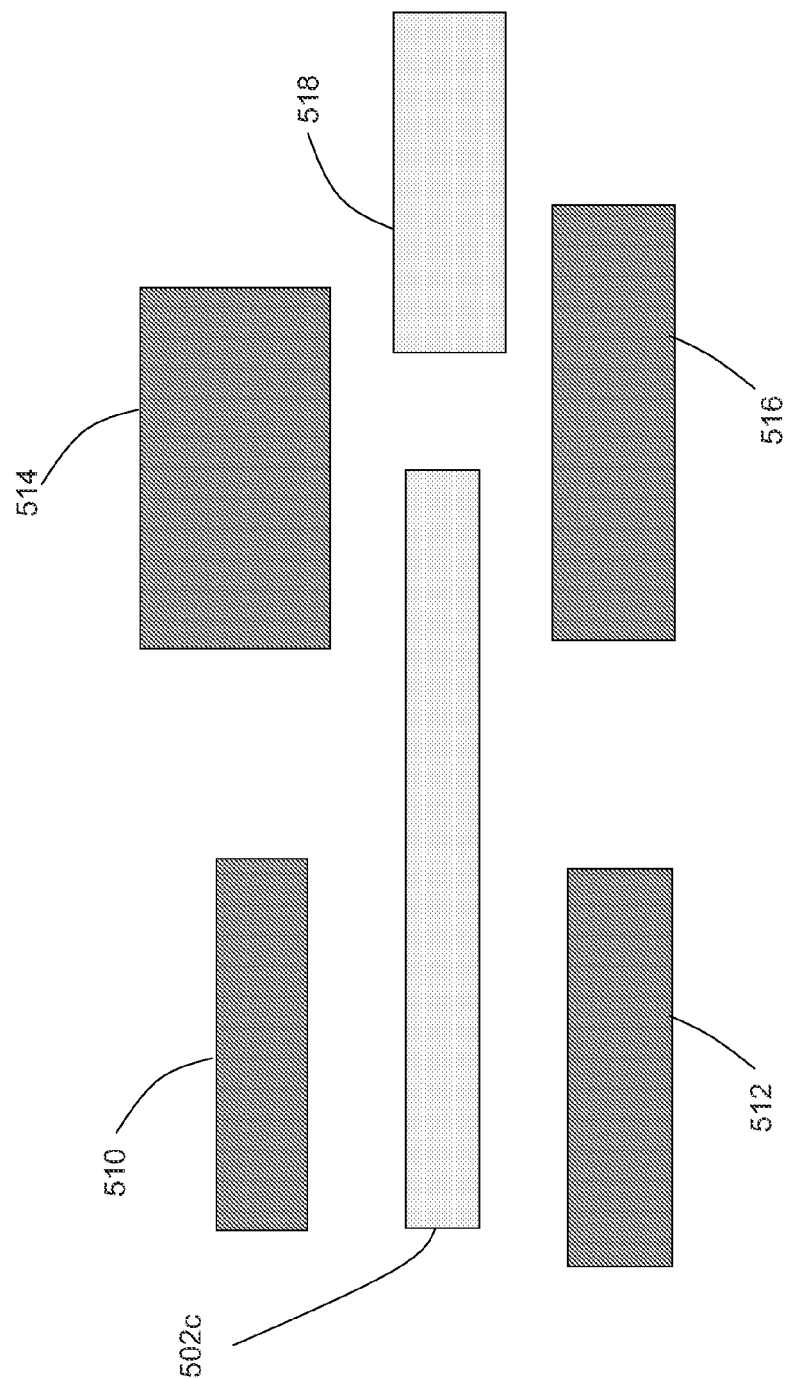

FIG. 5F shows an additional example where new shape 502c is created with even larger dimensions. As before, new shape 502c is a light colored shape, i.e., shape 502c is to be assigned to the second mask same as for shape 518. On the other hand, shapes 510, 512, 514, and 516 are dark colored shapes assigned to a different mask.

When a halo 504c is drawn around shape 502c as shown in FIG. 5G, the halo 504c now intersects shapes 510, 512, 514, 516, and 518. Recall that halo 504c corresponds to the minimum spacing distance that must be maintained between a given shape and any other shape for the same color for the design layer. This indicates that these other shapes are closer than the minimum spacing distance to new shape 502c, which would create a possible manufacturing problem if any of these intersected shapes correspond to the same color/mask assignment.

In this example, there is now a possible manufacturing problem, since shape 518 and new shape 502c have the same color, which means that both shapes are assigned to the mask. Therefore, the intersection between halo 504c and shape 518 cannot be ignored since it provides an indication that this configuration violates a double patterning spacing rule between shapes 502c and 518.

It is noted that insertion of shapes at one level of a design hierarchy may cause a double pattern violation at another level of the design hierarchy, e.g., inserting a shape in a cell may potentially cause a double pattern violation in an upper level of a hierarchy at locations where the cell under editing is being instantiated. According to some embodiments, such violations are addressed during layout editing, e.g., using the techniques described herein. According to another embodiment, these violations are not addressed during interactive editing.

This document will now describe an approach for resolving double pattern conflict problems according to some embodiments of the invention. As previously noted, a spatial query is used to identify spacing issues for shape and mask assignments on a given layer of the design. When new shapes are created in the layout, the shapes are checked for violations against other shapes for violations. According to a present embodiment, this check is performed twice, once for the original mask assignment of the shapes (e.g., inside of a cell), once for the opposite mask assignment of the shapes. If either one of these two checks produces no errors, that mask assignment will be used for this instance or shape. If only the second check produces no errors, the original mask assignment will be flipped for only this instance and/or shape. This is called mask assignment flipping.

On the other hand, if the two checks for the cell instance both produce errors, then the error cannot be resolved with mask assignment switching and the error will be reported to the user to indicate violations. According to one specific embodiment, the mask assignment flipping can only be utilized when a cell is instantiated. The new shape creation will not cause mask assignment flipping for both existing shapes in the current cell and the shapes in instantiated cells. The mask assignment switch approach can also be checked to make sure that it is a feasible approach for an interactive editor, e.g., to ensure that the analysis for the switching solution can be performed within sufficient time periods for an interactive tool.

Figure 6:
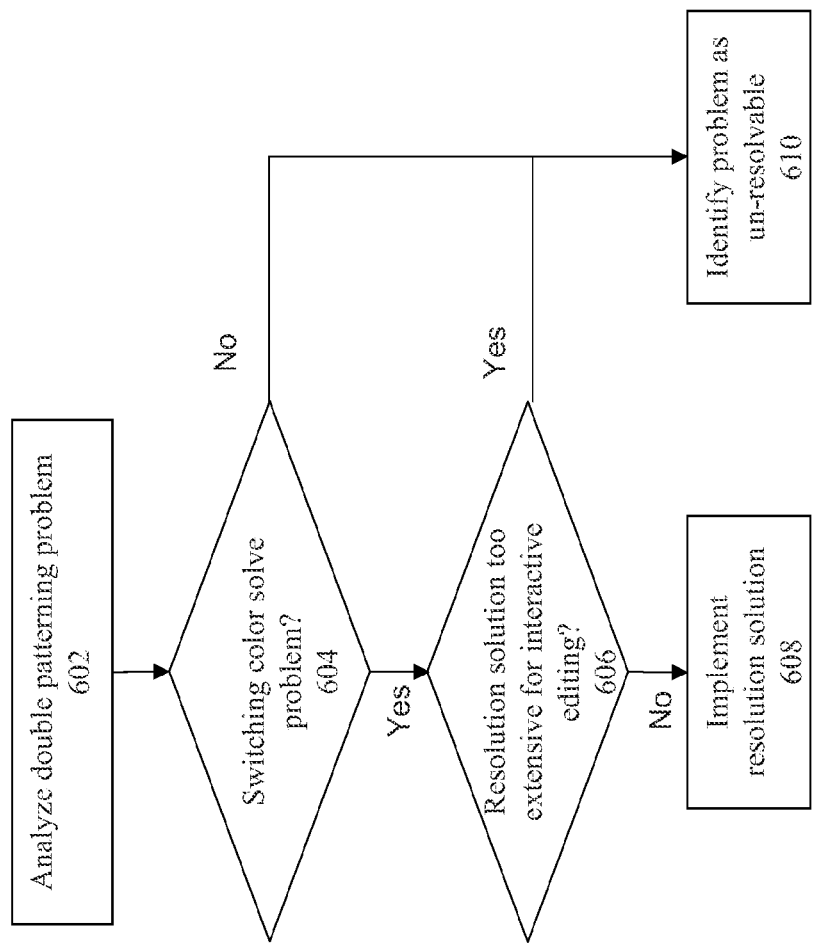
FIG. 6 illustrates a flowchart of an example approach for resolving a design violation in a layout that has been implemented for double pattern lithography.

FIG. 6 shows a flowchart of an approach according to one embodiment of the invention for determining whether an identified conflict problem for a layout or layout portion implemented for double patterning corresponds can be resolved with an interactive editing tool. At 602, analysis is performed on the shape patterns that form the basis for the identified spacing/assignment conflict.

A determination is made at 604 whether mask assignment switching can be performed to solve the problem. As previously noted, this determination is made by switching one or more color assignments to see if the change of color assignments will avoid a conflict. If mask assignment switching does not resolve the conflict problem, then the error is reported at 610.

According to some embodiments, even if a switch of color assignments can/may possibly resolve the immediate conflict problem, this solution will not be pursued if the cost of performing this resolution causes significant performance problems for the interactive layout editor, such that it becomes difficult to allow a user to "interact" with the layout editor in real-time. Therefore, at 606, a determination is made whether the possible solutions to the conflict problem are acceptable enough for performance reasons to be adopted by the interactive layout editor. For example, there are circumstances in which there are a large number of shapes in the layout having a certain color assignment, and the change of a color assignment for one shape will cause a chain reaction of color assignments that cascade throughout the entire design. Under this circumstance, it is possible that the system resources and costs needed to perform the extended analysis and implementation of a color change to resolve what was a localized conflict problem will far exceed the acceptable "hit" to performance expected of an interactive layout editor, particularly in terms of system response time and other real-time performance effects.

If the possible solution is acceptable, then at 608 the color switch is performed to resolve the conflict problem. Otherwise, at 610, the conflict problem is not resolved, and an error is reported to the user and/or the analysis results are otherwise stored on a computer readable medium.

To illustrate how mask assignment switches can be used to resolve color conflicts, reference is now made to the layout portion shown in FIG. 7A that includes shapes 702, 704, 706, and 708. Shapes 702 and 704 both have a light color, indicating assignment to a first common mask. Shapes 706 and 708 both have a darker color, indicating assignment to a second common mask.

Assume that it is desired to insert an instance 710 of cell A into this layout portion. Instance 710 includes two shapes 712 and 714. Assume that shape 712 has been given a light color, indicating assignment to the first mask. Shape 714 has been given a darker color, indicating assignment to the second mask.

Figure 7B:
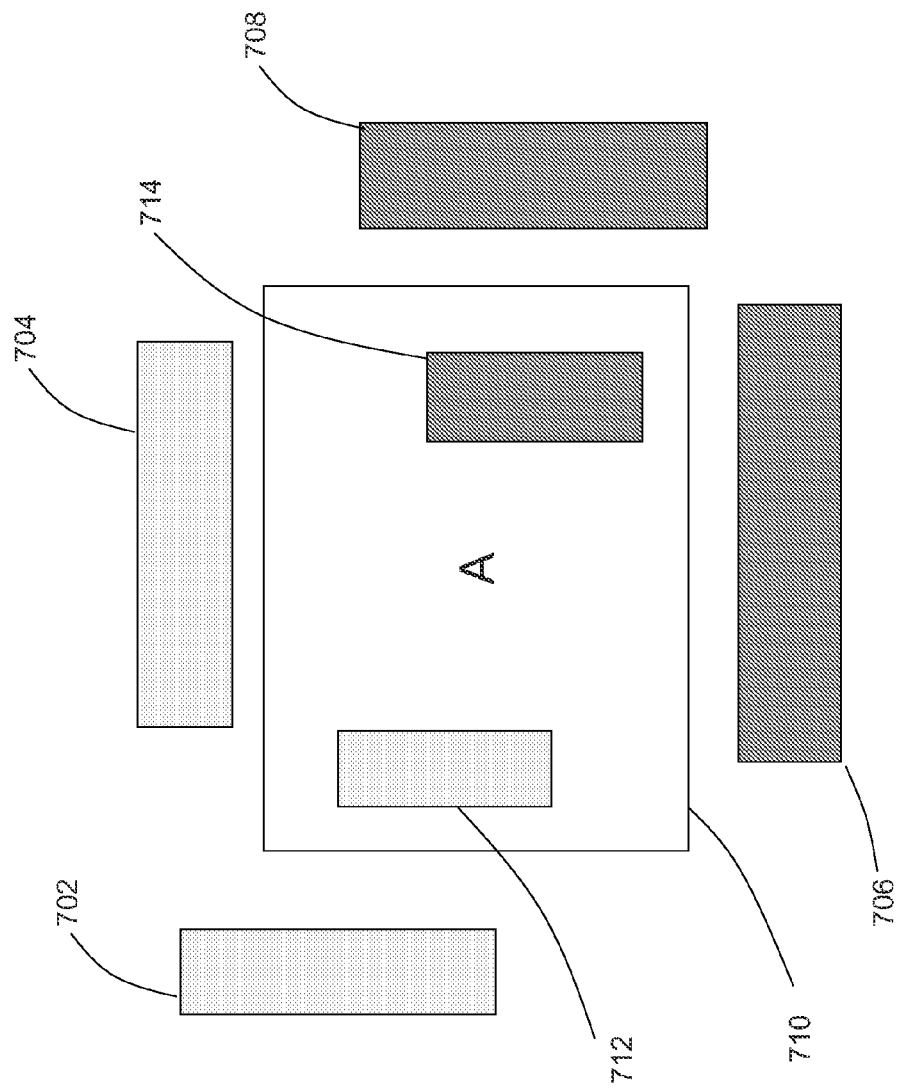

FIG. 7B shows the result of the insertion of instance 710 into the layout. To check for color conflicts, halos are drawn around the shapes 712 and 714 for the newly inserted instance 710 of cell A. As shown in FIG. 7C, halo 716 is drawn around shape 712 and halo 718 is drawn around shape 714.

Here it can be seen that halo 716 around shape 712 intersects shapes 702 and 704. Both of these intersecting shapes 702 and 704 have the same lighter color as shape 712. Therefore, insertion of shape 712 will cause a color conflict with shapes 702 and 704.

Halo 718 around shape 714 will also intersects some shapes, namely shapes 706 and 708. Both of these intersecting shapes 706 and 708 have the same darker color as shape

714. Therefore, insertion of shape 714 will also cause a color conflict, i.e., with shapes 706 and 708.

Figure 7D:
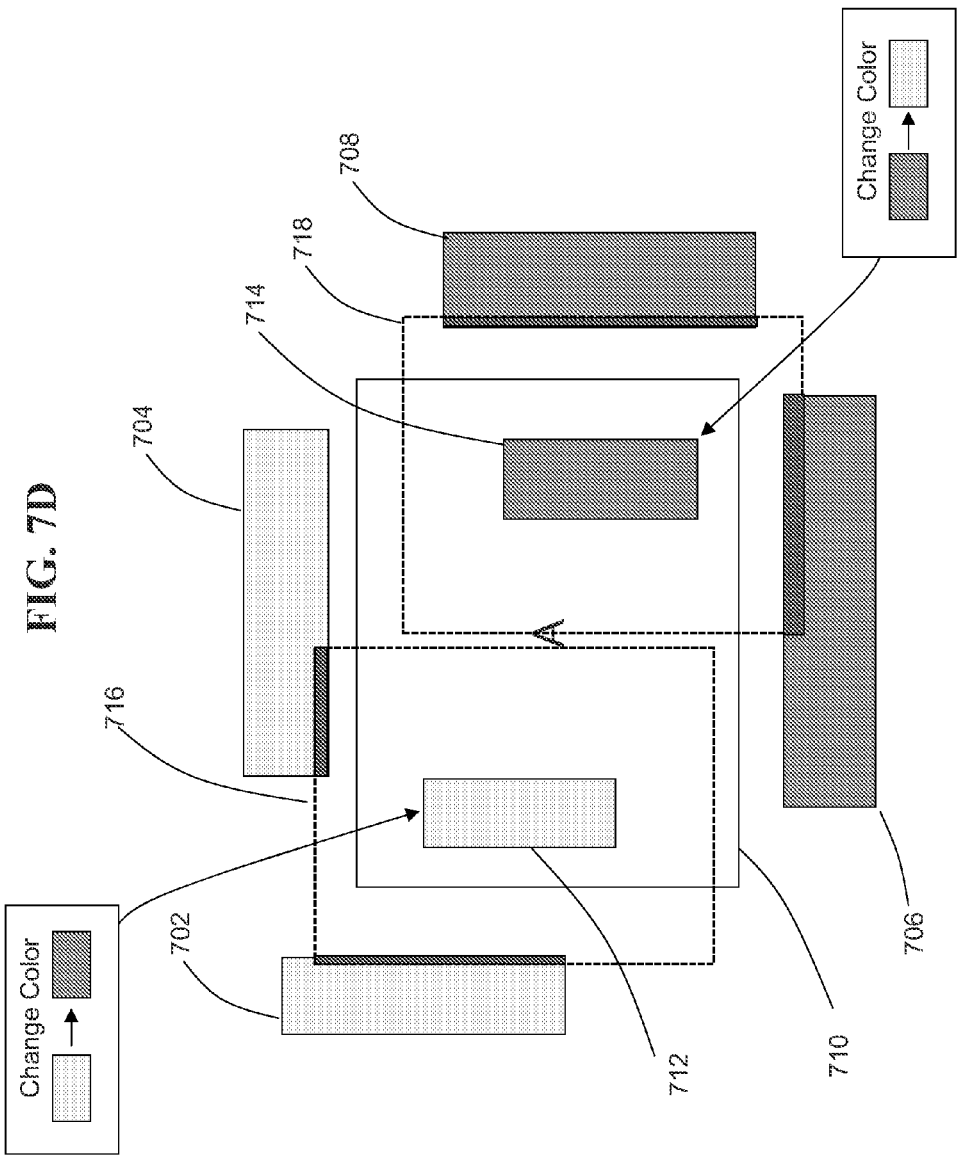

The possible solution to these color conflict problems is to perform a mask assignment switch. As illustrated in FIG. 7D, shape 712 can be identified to undergo a mask assignment switch to change from the lighter color to the darker color, indicating an assignment change from the first mask to the second mask. Similarly, shape 714 can be identified to undergo a mask assignment switch to change from the darker color to the lighter color, indicating an assignment change from the second mask to the first mask.

The result of this color/mask assignment change is shown in FIG. 7E. Here, it can be seen that shape 712 now has a darker color, indicating assignment to the second mask. Shape 714 now has a lighter color, indicating assignment to the first mask.

To check that the color conflicts have been resolved, the previous halos can be redrawn around shapes 712 and 714. As shown in FIG. 7F, halo 716 is drawn around shape 712 and halo 718 is drawn around shape 714. As before, halo 716 around shape 712 intersects shapes 702 and 704. However, due the color change, both of these intersecting shapes 702 and 704 now have a different color from shape 712. Therefore, insertion of shape 712 having a darker color will not cause a color conflict with shapes 702 and 704 which both have the lighter color.

As was previously discussed, halo 718 around shape 714 will intersect shapes 706 and 708. However, due the color change, both of these intersecting shapes 706 and 708 now have a different color from shape 714. Therefore, insertion of shape 714 having a lighter color will not cause a color conflict with shapes 706 and 708 which both have the darker color.

Figure 8A:
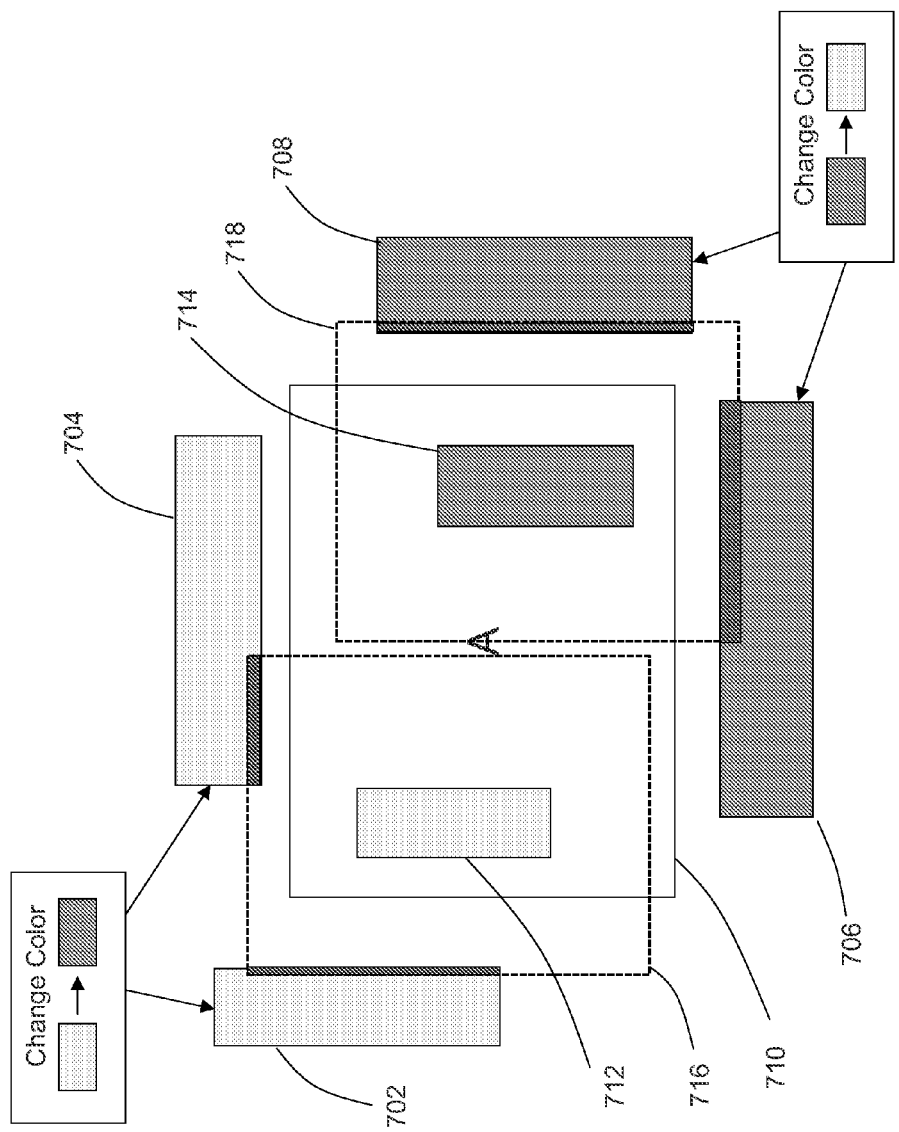

FIG. 8A shows an alternate approach to implement the mask assignment changes to resolve the color conflict problems. In this alternate approach, instead of performing a color switch for the newly inserted shapes, color switches are made for shapes that already exist in the layout.

In the example of FIG. 8A, existing shapes 702 and 704 are identified to undergo a mask assignment switch to resolve the conflict with newly inserted shape 712. In particular, these shapes 702 and 704 are identified for a color change from the lighter color to the darker color, indicating an assignment change from the first mask to the second mask. Similarly, existing shapes 706 and 708 are identified to undergo a mask assignment switch to resolve the conflict with newly inserted shape 714. These shapes 706 and 708 are identified for a color change from the darker color to the lighter color, indicating an assignment change from the second mask to the first mask.

The result of these color/mask assignment changes is shown in FIG. 8B. Here, it can be seen that shapes 702 and 704 have the darker color, indicating assignment to the second mask. Shapes 706 and 708 now correspond to the lighter color, indicating assignment to the first mask.

Figure 8C:
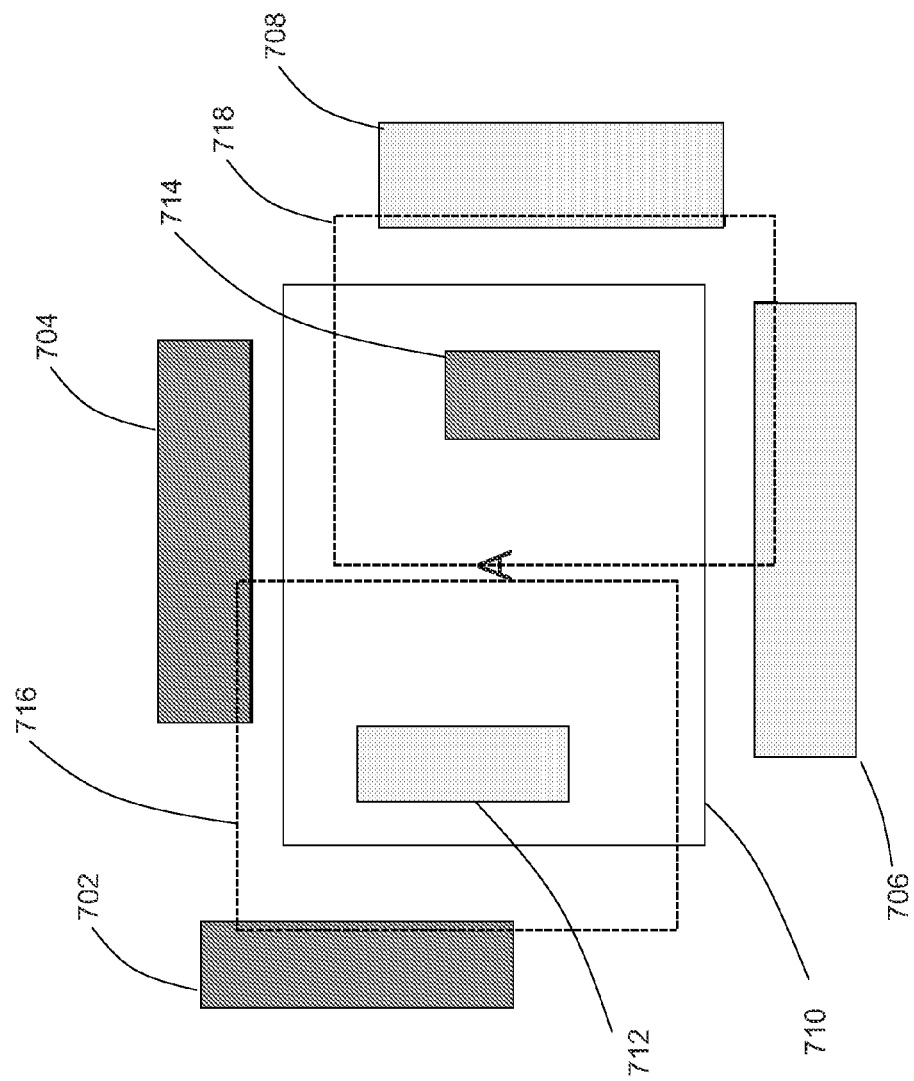

To check that the color conflicts have been resolved, the previous halos can be redrawn around shapes 712 and 714. As shown in FIG. 8C, halo 716 is drawn around shape 712 and halo 718 is drawn around shape 714. As before, halo 716 around shape 712 intersects shapes 702 and 704. However, due the color change, both of these intersecting shapes 702 and 704 now have a different color from shape 712. Therefore, insertion of shape 712 having a darker color will not cause a color conflict with shapes 702 and 704 which both have the lighter color.

Halo 718 around shape 714 will intersect shapes 706 and 708, same as before. However, due the color change, both of these intersecting shapes 706 and 708 now have a different color from shape 714. Therefore, insertion of shape 714 having a lighter color will not cause a color conflict with shapes 706 and 708 which both have the darker color.

FIG. 9A shows another example to illustrate situations in which mask assignment switches cannot be used to resolve color conflicts. An example layout portion is shown in this figure that includes shapes 802, 804, 806, and 808. Unlike the example of FIG. 7A, where shapes 702 and 704 both have a light color and shapes 706 and 708 both have a darker color, the example of FIG. 9A has shapes 802 and 806 with light colors and shapes 804 and 808 with dark colors. These colorings indicate that shapes 802 and 806 are both assigned to a first common mask while shapes 804 and 808 are assigned to a second common mask.

Assume that it is desired to insert an instance 810 of cell A into this layout portion. Instance 810 includes two shapes 812 and 814. Assume that shape 812 has been given a dark color, indicating assignment to the second mask. Shape 814 has been given a lighter color, indicating assignment to the first mask.

Figure 9B:
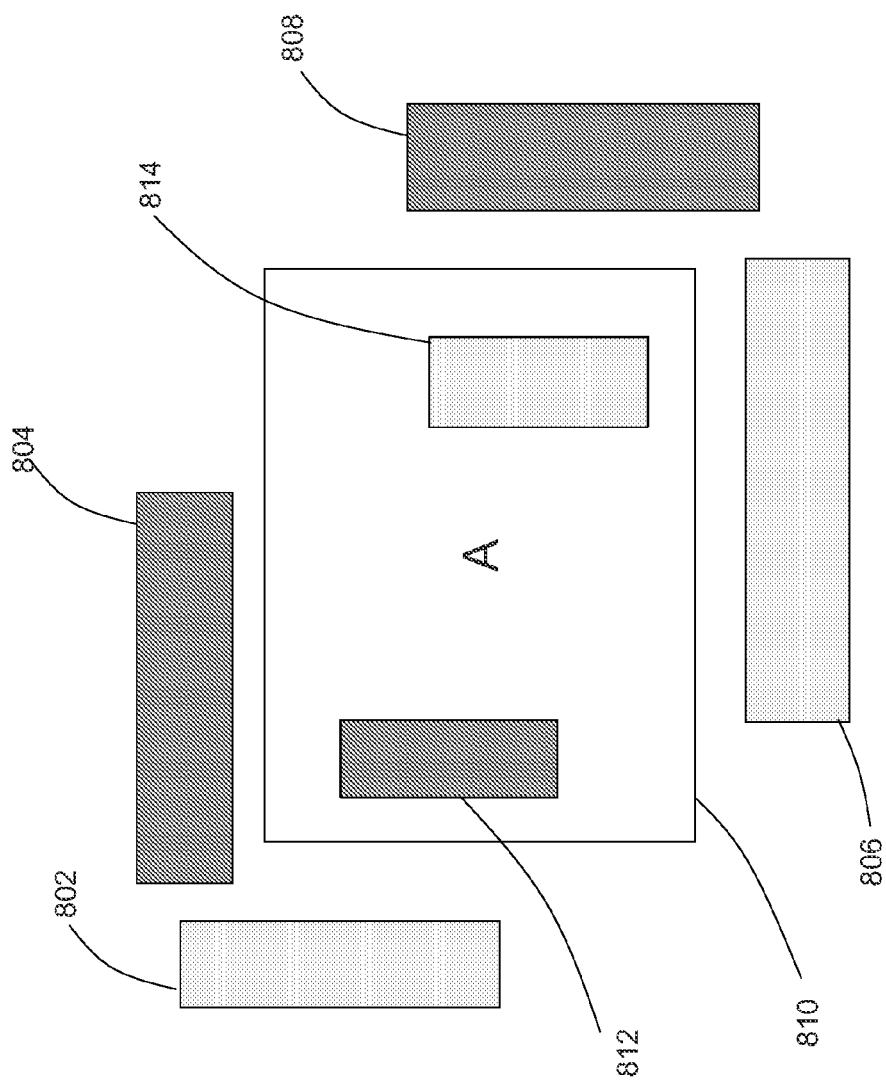
Figure 9C:
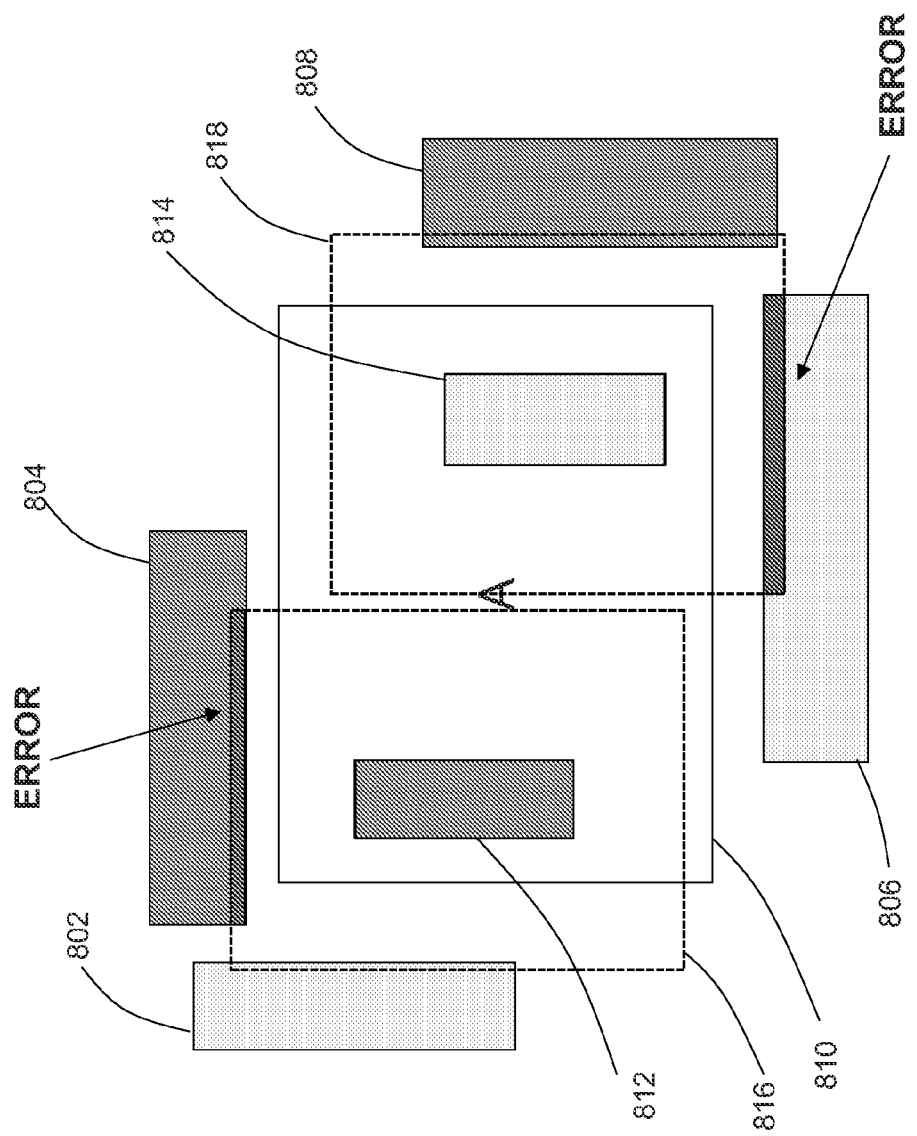

FIG. 9B shows the result of the insertion of instance 810 into the layout. To check for color conflicts, halos are drawn around the shapes 812 and 814 for the newly inserted instance 810 of cell A. As shown in FIG. 9C, halo 816 is drawn around shape 812 and halo 818 is drawn around shape 814.

It can be seen that halo 816 around shape 812 intersects shapes 802 and 804. Here, shape 804 has the same darker color as shape 812. Therefore, insertion of shape 812 will cause a color conflict with shape 804.

Halo 818 around shape 814 will also intersects some shapes, namely shapes 806 and 808. Shape 806 has the same lighter color as shape 814. Therefore, insertion of shape 814 will also cause a color conflict with shape 806.

Here, an attempt can be made to resolve the color conflict problems by performing mask assignment switches for shapes 812 and 814. As illustrated in FIG. 9D, shape 812 can be identified to undergo a mask assignment switch to change from the darker color to the lighter color, indicating an assignment change from the second mask to the first mask. Similarly, shape 814 can be identified to undergo a mask assignment switch to change from the lighter color to the darker color, indicating an assignment change from the first mask to the second mask.

The result of this color/mask assignment change is shown in FIG. 9E. Here, it can be seen that shape 812 now has a lighter color, indicating assignment to the first mask. Shape 814 now has a darker color, indicating assignment to the second mask.

To check whether the color conflicts have been resolved, the previous halos can be redrawn around shapes 812 and 814. As shown in FIG. 9F, halo 816 is drawn around shape 812 and halo 818 is drawn around shape 814.

As before, halo 816 around shape 812 intersects shapes 802 and 804. Due the color change, the intersecting shape 804 no longer presents a color conflict since it now has a different color from shape 812. However, intersecting shape 802 now has the same color as shape 812. Therefore, the mask assignment switch for shape 812 was unsuccessful since it has created a new color conflict with shape 802.

Same as before, halo 818 around shape 814 intersects shapes 806 and 808. Due the color change, the intersecting shape 808 no longer presents a color conflict since it now has a different color from shape 814. However, intersecting shape 806 now has the same color as shape 814. Therefore, the mask assignment switch for shape 814 was also unsuccessful since it has created a new color conflict with shape 806.

In this example, the color conflicts also cannot be resolved by performing mask assignment switches for shapes 802,

804, 806, and 808. This is because shapes 802 and 804 are spaced too close together to be assigned to the same mask. Therefore, shape 802 and 804 must remain with opposite colors. Similarly, shapes 806 and 808 are also spaced too close together to be assigned to the same mask. Therefore, shape 806 and 808 must remain with opposite colors.

No matter what, a shape of either color inserted into the same positions as 812 and 814 will therefore cause a color conflict. Therefore, the situation shown in FIG. 9A cannot be resolved by a mask assignment switch.

FIG. 10A provides an example to illustrate situations in which it may not possible and/or advisable to perform mask assignment switches because of its detrimental effects on real-time performance for interactive layout editing activities. This figure shows an example layout portion that includes shapes 1002, 1004, 1006, and 1008a-d. While only four shapes 1008a-d in an extended sequence of shapes are directly shown in this figures, it is noted and assumed that there are likely to be many more shapes in that sequence which are not shown in the figure, with many possible variations of color schemes in that non-shown sequence. Shapes 1002, 1004, 1006, 1008b, and 1008d all correspond to a lighter color, indicating assignment to a first common mask. Shapes 1008a and 1008c correspond to a darker color, indicating assignment to a second common mask.

It is assumed that an instance 1010 of cell A is to be inserted into this layout portion. Instance 1010 includes two shapes 1012 and 1014. Assume that shape 1012 has been given a dark color, indicating assignment to the second mask. Shape 1014 has been given a lighter color, indicating assignment to the first mask.

Figure 10B:
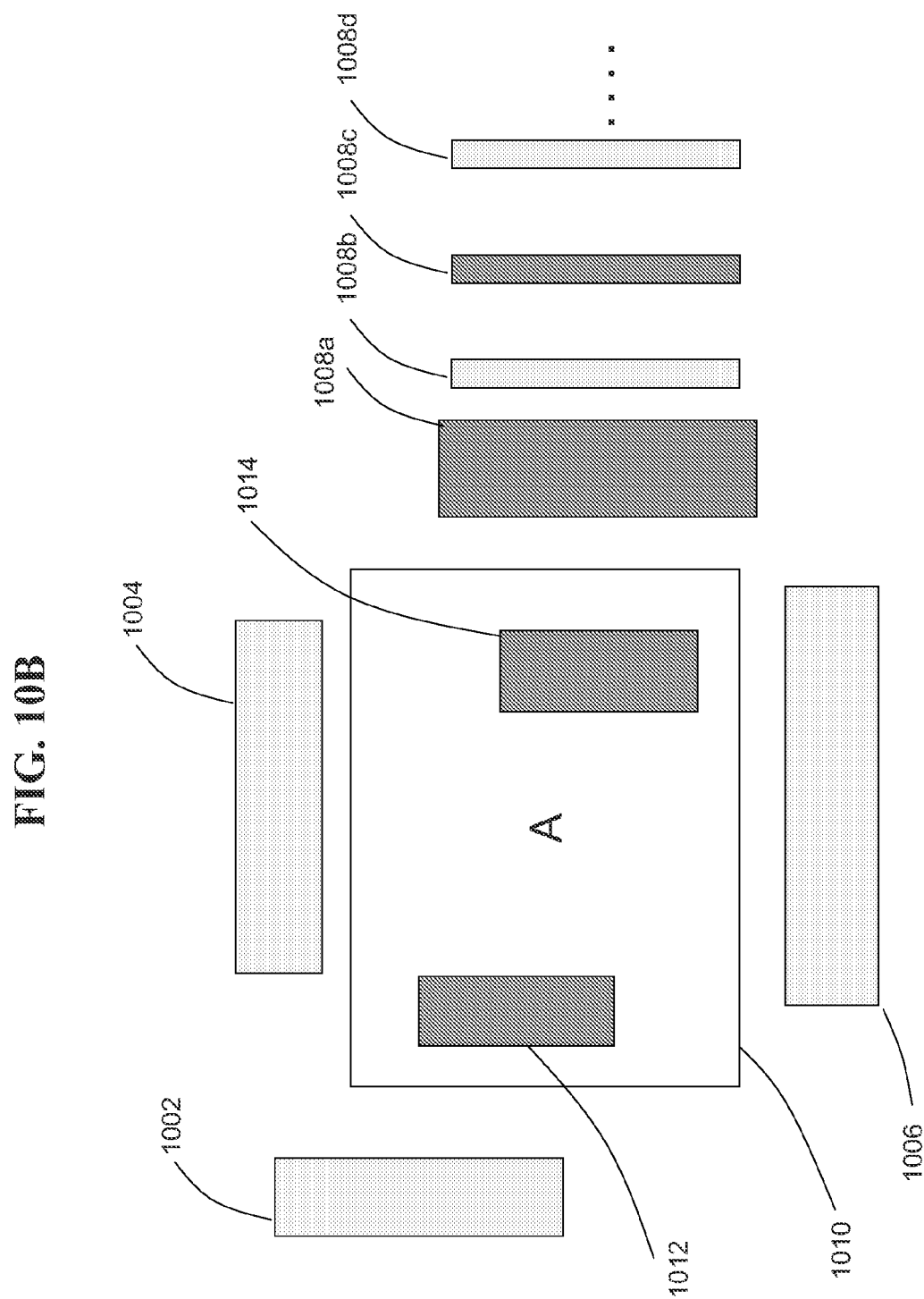
Figure 10D:
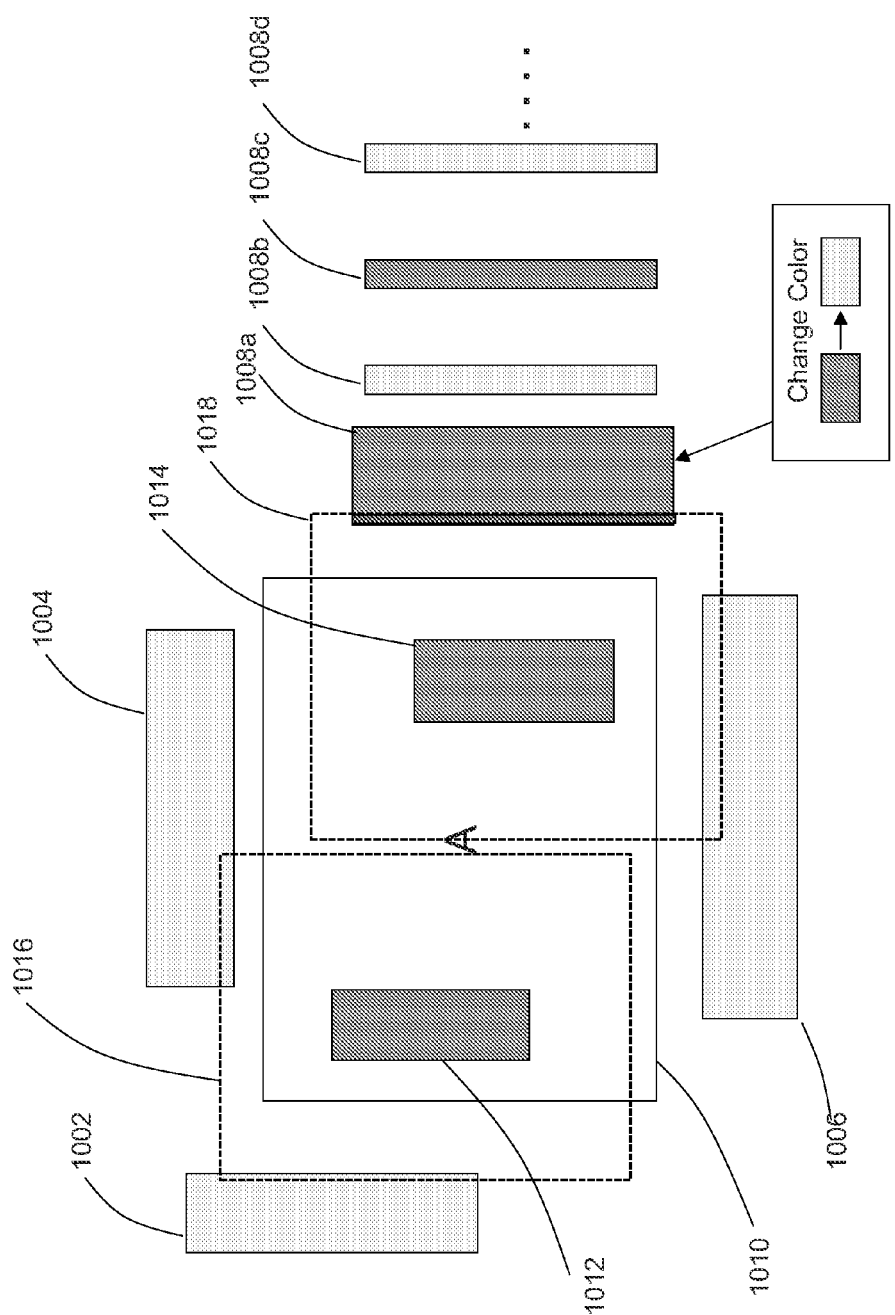

FIG. 10B shows the result of the insertion of instance 1010 into the layout. To check for color conflicts, halos are drawn around the shapes 1012 and 1014 for the newly inserted instance 1010 of cell A. As shown in FIG. 10C, halo 1016 is drawn around shape 1012 and halo 1018 is drawn around shape 1014.

It can be seen that halo 1016 around shape 1012 intersects shapes 1002 and 1004. Here, both shapes 1002 and 1004 have a different color from the darker color of shape 1012. Therefore, insertion of shape 1012 will not cause a color conflict with shapes 1002 and 1004.

Halo 1018 around shape 1014 intersects shapes 1006 and 1008a. Shape 1006 has a lighter color that is different from the darker color of shape 1014. Therefore, there is no color conflict between shapes 1006 and 1014. However, intersected shape 1008a has the same darker color as shape 1014. Therefore, insertion of shape 1014 will cause a color conflict with shape 1008a.

The color conflict problem in this example cannot be resolved by performing a mask assignment switch for shape 1014. This is because changing the color of shape 1014, even though it will resolve the color conflict with 1008a, will cause a new color conflict with shape 1006.

The problem with performing a mask reassignment on shape 1008a is that there is likely to be a significantly large sequence/combination of shapes that extend beyond shape 1008a. Once there is a color change that is made in one part of that lengthy sequence of shapes, it is quite likely that there will be some sort of chain reaction that requires an extensive number and combination of further color changes to be made through that sequence.

Figure 10E:
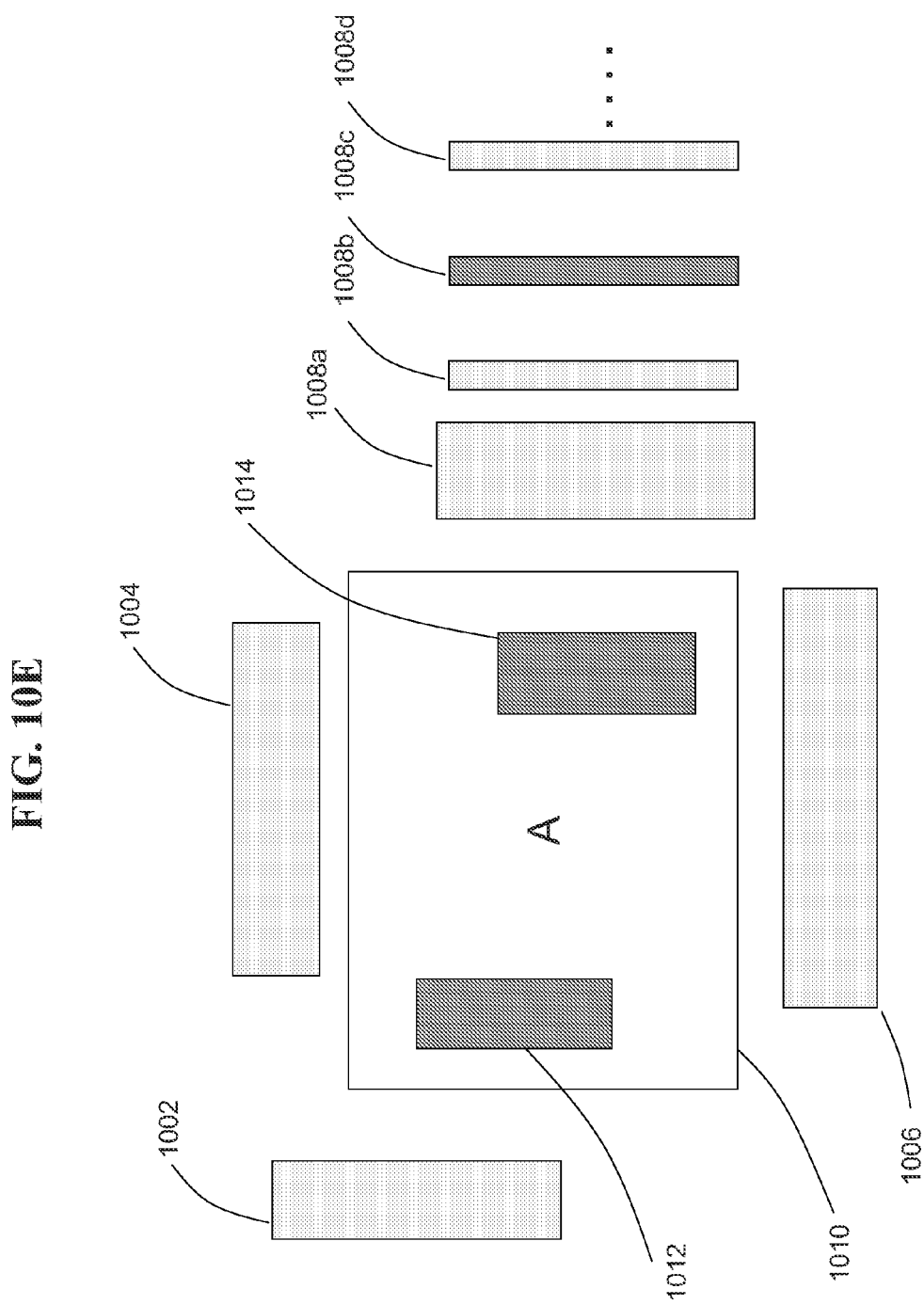

For example, as shown in FIG. 10E, the result of the color change for shape 1008a is that this shape now corresponds to a light color. However, as shown in FIG. 10F, a color conflict now exists between shapes 1008a and 1008b since both have the same light color and are too close together. To address this color conflict, shape 1008b must undergo a color change to become the darker color, as shown in FIG. 10G. However, as shown in FIG. 10H, a color conflict now exists between shapes 1008b and 1008c as a result of this latest color change, since both shapes have the same darker color and are too close together. To address this color conflict, shape 1008c must now undergo a color change to become the lighter color, as shown in FIG. 10I. This results in yet another color conflict, since shapes 1008c and 1008d now both have the same light color and are too close together.

This sequence of extended color changes may continue for a large number of shapes in many combinations of possible color changes, consuming a significant amount of system resources and producing a lengthy perceived delay for the user of the layout editing tool. This lengthy delay may be unacceptable if the layout editing tool is being used in an interactive mode. Even worse, it is possible that somewhere far down in the sequence of shapes after expenditure of the system resources and the lengthy delay, it may be discovered that the color changes has resulted in a non-resolvable color conflict.

Therefore, some embodiments will limit or avoid performing mask re-assignments when such mask reassignments may cause excessive delays and/or negative performance effects on interactive layout editing. According to one embodiment, mask assignment switching may be performed only on the shapes or instances being inserted into the design, and are not performed on existing shapes in the layout. According to another embodiment, mask assignment switching may be performed on existing shapes in the layout, but only if the chain of switching does not exceed a specified threshold number.

Therefore, what has been described is an improved approach for implementing an interactive layout editor to address double patterning layout designs. Spatial queries can be performed to check for the existence of double pattern violations, where the violations are analyzed to determine whether they can be corrected. Mask assignment switching is one possible approach to resole double pattern violations, where the possible performance effects upon interactive editing is checked to see if the possible resolution is acceptable for interactive editing purposes. Therefore, when an error is detected by some embodiments, the layout editing environment will decide whether to remove the newly created object in the layout (shape or cell instance), or allow the new object to be created and let batch mode checking to adjust the mask assignment to make it satisfy corresponding design rules. In one embodiment, a conservative approach is taken when flagging errors, so that a subsequent mask assignment can eliminate the error flagged by the current approach.

System Architecture

Figure 11:
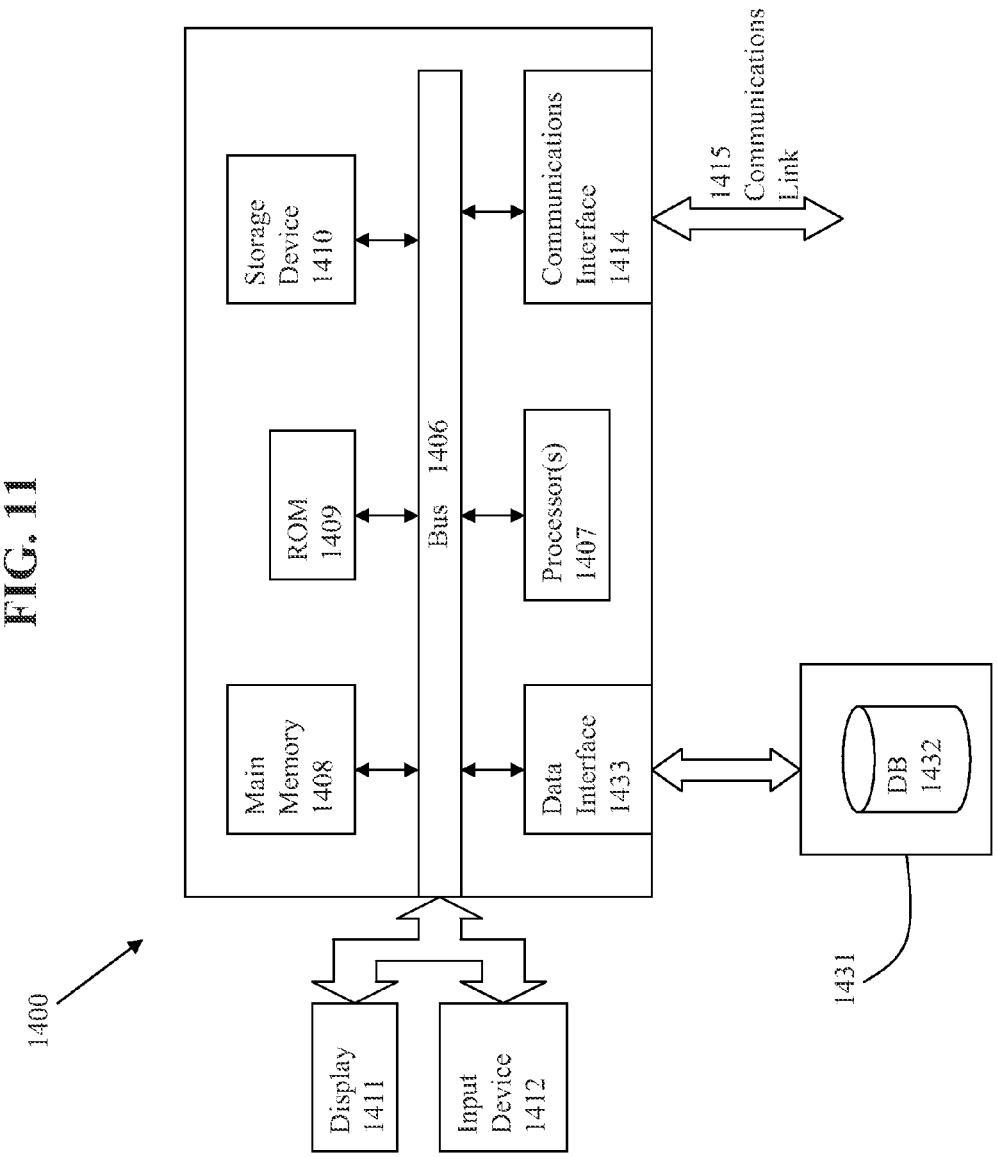
FIG. 11 is a block diagram of a computing system suitable for implementing an embodiment of the present invention.

FIG. 11 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method for performing interactive editing of an electronic circuit design, the method implemented with a processor, the method comprising:
using at least one processor to perform a process, the process comprising:
identifying an object in a layout of the electronic circuit design, wherein the object is to be manufactured with double patterning technology;
checking whether the object corresponds to a double patterning violation by associating the object with a layer purpose pair and by using a spatial query around the object when the object is being created in the layout;
determining whether a corrective solution is to be implemented to resolve the double patterning violation; and
determining whether the corrective solution is to be implemented interactively.

2. The computer implemented method of claim 1 in which the double patterning violation comprises a spacing violation between the object and a second object assigned to a common mask for manufacturing.

3. The computer implemented of claim 2 in which the second object is an existing object in the layout and the object is a newly inserted object in the layout, and in which the corrective solution comprises a mask reassignment of the object such that the object is assigned to a different mask for manufacturing.

4. The computer implemented of claim 2 in which the second object is an existing object in the layout and the object is a newly inserted object in the layout, and the corrective solution comprises a mask reassignment of the second object such that the second object is assigned to a different mask for manufacturing.

5. The computer implemented of claim 1 in which the object comprise a shape within an instance of a cell, and the act of checking whether the object corresponds to a double patterning violation is performed when one or more physical attributes of the object are being changed by a user during a time for modifying the layout.

6. The computer implemented method of claim 1 in which a spatial query is performed to check whether the object corresponds to the double patterning violation, wherein the spatial query is implemented by configuring a halo around the object, and in which the double patterning violation is detected if another object having a same mask assignment as the object intersects or falls within the halo.

7. The computer implemented method of claim 1 in which the corrective solution is analyzed to determine whether the corrective solution causes unacceptable performance effects for interactive editing of the layout.

8. The computer implemented method of claim 7 in which the unacceptable performance effects for interactive editing are identified based at least in part upon identification of a cascaded chain of mask assignments that exceeds a threshold number of reassignments.

9. The computer implemented method of claim 1 further comprising displaying an error indication or storing the error indication in a non-transitory computer readable medium if an acceptable corrective solution cannot be implemented.

10. A computer program product embodied on a non-transitory computer usable medium, the non-transitory computer readable medium having stored thereon a sequence of instructions which, when executed by at least one processor causes the at least one processor to execute a method for performing interactive editing of an electronic circuit design, the method comprising:
using the at least one processor to perform a process, the process comprising:
identifying an object in a layout of the electronic circuit design, wherein the object is to be manufactured with double patterning technology;
checking whether the object corresponds to a double patterning violation by associating the object with a layer purpose pair and by using a spatial query around the object when the object is being created in the layout;
determining whether a corrective solution can be implemented to resolve the double patterning violation; and
determining whether the corrective solution can be implemented interactively.

11. The computer program product of claim 10 in which the double patterning violation comprises a spacing violation between the object and a second object assigned to a common mask for manufacturing.

12. The computer program product of claim 11 in which the second object is an existing object in the layout and the object is a newly inserted object in the layout, and in which the corrective solution comprises a mask reassignment of the object such that the object is assigned to a different mask for manufacturing.

13. The computer program product of claim 11 in which the second object is an existing object in the layout and the object is a newly inserted object in the layout, and the corrective solution comprises a mask reassignment of the second object such that the second object is assigned to a different mask for manufacturing.

14. The computer program product of claim 10 in which the object comprise a shape within an instance of a cell, and the act of checking whether the object corresponds to a double patterning violation is performed when one or more physical attributes of the object are being changed by a user during a time for modifying the layout.

15. The computer program product of claim 10 in which a spatial query is performed to check whether the object corresponds to the double patterning violation, wherein the spatial query is implemented by configuring a halo around the object, and in which the double patterning violation is detected if another object having a same mask assignment as the object intersects or falls within the halo.

16. The computer program product of claim 10 in which the corrective solution is analyzed to determine whether the corrective solution causes unacceptable performance effects for interactive editing of the layout.

17. The computer program product of claim 16 in which the unacceptable performance effects for interactive editing are identified based at least in part upon identification of a cascaded chain of mask assignments that exceeds a threshold number of reassignments.

18. The computer program product of claim 10 further comprising displaying an error indication or storing the error indication in a computer d\readable medium if an acceptable corrective solution cannot be implemented.

19. A system for interactive editing of an electronic circuit design, comprising:
   a processor;
   a memory to hold programmable code, wherein the programmable code includes instructions which, when executed by the processor, cause the processor to
      identify an object in a layout of the electronic circuit design, wherein the object is to be manufactured with double patterning technology,
      check whether the object corresponds to a double patterning violation by associating the object with a layer purpose pair and by using a spatial query around the object when the object is being created in the layout,
      determine whether a corrective solution can be implemented to resolve the double patterning violation, and
      determine whether the corrective solution can be implemented interactively.

20. The system of claim 19 in which the double patterning violation comprises a spacing violation between the object and a second object assigned to a common mask for manufacturing.

21. The system of claim 20 in which the second object is an existing object in the layout and the object is a newly inserted object in the layout, and in which the corrective solution comprises a mask reassignment of the object such that the object is assigned to a different mask for manufacturing.

22. The system of claim 20 in which the second object is an existing object in the layout and the object is a newly inserted object in the layout, and the corrective solution comprises a mask reassignment of the second object such that the second object is assigned to a different mask for manufacturing.

23. The system of claim 19 in which the object comprise a shape within an instance of a cell, and the act of checking whether the object corresponds to a double patterning violation is performed when one or more physical attributes of the object are being changed by a user during a time for modifying the layout.

24. The system of claim 19 in which the programmable code further comprises instructions performing a spatial query to check whether the object corresponds to the double patterning violation, wherein the spatial query is implemented by configuring a halo around the object, and in which the double patterning violation is detected if another object having a same mask assignment as the object intersects or falls within the halo.

25. The system of claim 19 in which the programmable code further comprises instructions for analyzing the corrective solution to determine whether the corrective solution causes unacceptable performance effects for interactive editing of the layout.

26. The system of claim 25 in which the unacceptable performance effects for interactive editing are identified based at least in part upon identification of a cascaded chain of mask assignments that exceeds a threshold number of reassignments.

27. The system of claim 19 in which the programmable code further comprises instructions for displaying an error indication or storing the error indication in a computer d\readable medium if an acceptable corrective solution cannot be implemented.

* * * * *